(12) United States Patent
Matsumoto

(10) Patent No.: US 7,543,617 B2
(45) Date of Patent: Jun. 9, 2009

(54) PNEUMATIC TIRE HAVING NARROW GROOVES IN SIDE SURFACE OF LONGITUDINAL MAIN GROOVE

(75) Inventor: Tadao Matsumoto, Hyogo (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 142 days.

(21) Appl. No.: 11/195,685

(22) Filed: Aug. 3, 2005

(65) Prior Publication Data
US 2006/0042738 A1    Mar. 2, 2006

(30) Foreign Application Priority Data
Aug. 31, 2004    (JP)    ............... 2004-253367

(51) Int. Cl.
  *B60C 11/13*    (2006.01)
(52) U.S. Cl. .................. 152/209.21; 152/209.24
(58) Field of Classification Search ............ 152/209.21, 152/209.24
See application file for complete search history.

(56) References Cited

U.S. PATENT DOCUMENTS

| | | | |
|---|---|---|---|
| 2,843,172 A | | 7/1958 | Berry et al. |
| 5,031,680 A | * | 7/1991 | Kajikawa et al. ....... 152/209.21 |
| 5,373,882 A | | 12/1994 | Nakagawa |
| 5,386,861 A | * | 2/1995 | Overhoff et al. ....... 152/209.21 |
| 5,535,798 A | * | 7/1996 | Nakamura ............. 152/209.21 |
| 6,250,354 B1 | * | 6/2001 | Kawai ................... 152/209.21 |
| 6,415,835 B1 | | 7/2002 | Heinen |
| 6,986,372 B2 | * | 1/2006 | Below .................. 152/209.21 |
| 7,195,044 B2 | * | 3/2007 | Maxwell et al. ........ 152/209.21 |

FOREIGN PATENT DOCUMENTS

| | | | |
|---|---|---|---|
| CA | 2083627 | * | 9/1999 |
| DE | 8708747.2 | | 1/1987 |
| DE | 3824897 | | 1/1990 |
| DE | 68906731 T2 | | 9/1993 |
| DE | 69306623 T2 | | 5/1997 |
| DE | 69414692 T2 | | 4/1999 |
| EP | 0354718 B1 | | 5/1993 |
| EP | 0561531 B1 | | 12/1996 |
| EP | 0686098 B1 | | 11/1998 |
| EP | 0997323 A2 | | 5/2000 |
| EP | 1048488 A2 | | 11/2000 |
| GB | 460338 | | 1/1937 |
| JP | 09-136515 | * | 5/1997 |
| JP | 10-315711 A | | 12/1998 |
| JP | 2003-146024 | * | 5/2003 |

* cited by examiner

*Primary Examiner*—Steven D Maki
(74) *Attorney, Agent, or Firm*—Birch, Stewart, Kolasch & Birch, LLP

(57) ABSTRACT

A pneumatic tire including a longitudinal main groove formed concavely on a tread surface thereof in a radial direction thereof by extending the longitudinal main groove linearly in a circumferential direction thereof; and narrow grooves formed concavely on at least an outer side surface of both side surfaces of the longitudinal main groove opposed to each other in a widthwise direction of the pneumatic tire by spacing the narrow grooves at certain intervals in a circumferential direction of the pneumatic tire. Each of the narrow grooves is so configured that a longer side of each of the narrow grooves extends in the radial direction of the pneumatic tire and that a shorter side of each of the narrow grooves extends in the circumferential direction of the pneumatic tire. A sectional configuration of a position having a maximum sectional area in each of the narrow grooves is circular arc-shaped.

8 Claims, 18 Drawing Sheets

Prior Art

PNEUMATIC TIRE HAVING NARROW GROOVES IN SIDE SURFACE OF LONGITUDINAL MAIN GROOVE

This nonprovisional application claims priority under 35 U.S.C. § 119(a) on patent application Ser. No(s). 2004-253367 filed in Japan on Aug. 31, 2004, the entire contents of which are hereby incorporated by reference.

FIELD OF THE INVENTION

The present invention relates to a pneumatic tire and more particularly to a pneumatic tire having high draining performance and reducing noise generated when a vehicle travels.

DESCRIPTION OF THE RELATED ART

The pneumatic tire of this kind that is mounted on a vehicle is demanded to improve anti-aquaplaning performance by enhancing draining performance on a wet road and reduce tire-caused noise which is a main factor of noise generated outside the body of the vehicle.

As the tire-caused noise, an air-column resonated sound and an impact sound are known. A tubular air column is generated in a space between a road surface and a longitudinal main groove formed circumferentially on a tire tread surface. The air-column resonated sound is generated by repetition of compression and expansion of the air column. The impact sound is generated when the tread surface strikes the road surface when the tread surface contacts the road surface.

FIG. 16 is a graph showing the relationship between frequencies of the tire-caused noise and sound pressure levels when a vehicle traveled at (A) 35 kilometers an hour (FIG. 16A) and (B) 50 kilometers an hour (FIG. 16B).

The relationship between frequencies of the tire-caused noise and the sound pressure levels was measured by using four kinds of tires at each of the above-described speeds. The four kinds of tires includes (1) a tire not having a groove formed on its tread surface 1 (see FIG. 17A), (2) a tire having two linear longitudinal main grooves 2, formed on its tread surface 1, which extend in the circumferential direction of the tire (see FIG. 15B), (3) a tire having four linear longitudinal main grooves 2, formed on its tread surface 1, which extend in the circumferential direction of the tire (see FIG. 17C), and (4) a tire having four linear longitudinal main grooves 2, formed on its tread surface 1, which extend in the circumferential direction of the tire and lateral grooves 3 intersecting with the linear longitudinal main grooves 2 (see FIG. 17D).

As shown in FIG. 16, the tire-caused noise has a peak at 800 to 1000 Hz. It is analyzed that the noise in the range of 800 to 1000 Hz is generated owing to the air-column resonated sound caused by the air column formed in the longitudinal main groove. The noise of the air-column resonated sound cannot be ignored.

The frequency of the air-column resonated sound is determined in dependence on a length of the tread surface which contacts the road surface. Thus it can be confirmed from the graph of FIG. 16 that when a plurality of longitudinal main grooves that contact the road surface in an equal length is formed on the tread surface, air-column resonated sounds having the same frequency are generated and overlap each other, thus generating a big noise. Therefore it is important to reduce the air-column resonated sound in the tire having a plurality of longitudinal main grooves formed on the tread surface thereof.

Comparing the air-column resonated sound when the vehicle travels at 35 kilometers an hour (see FIG. 16A) and the air-column resonated sound when the vehicle at 50 kilometers an hour (see FIG. 16B) with each other, the air-column resonated sound when the vehicle travels at 50 kilometers an hour is bigger than the air-column resonated sound when the vehicle travels at 35 kilometers an hour. This indicates that as the flow speed of air becomes faster in the longitudinal main groove, a clear air column is generated and the air-column resonated sound becomes increasingly big.

The air-column resonated sound depends on the sectional area of the longitudinal main groove. Thus as the quantity of air in the longitudinal main groove increases, a large air column is formed in the longitudinal main groove and the air-column resonated sound becomes increasingly large.

When the volume (sectional area) of the longitudinal main groove is set small, a small amount of air flows in the longitudinal main groove. Thus a small air column is generated in the space between the road surface and the longitudinal main groove. Thereby the degree of the air-column resonated sound can be reduced.

When the volume of the longitudinal main groove formed on the tread surface in the circumferential direction of the tire is set small, the tire has a low degree of draining performance and has thus a low degree of anti-aquaplaning performance. It is difficult to provide the tire with both noise-reducing performance and wet performance. That is, it is very difficult to provide the tire with both noise-reducing performance and anti-aquaplaning performance.

Therefore in consideration of the wet performance, it is not preferable to reduce the air-column resonated sound by reducing the volume (sectional area) of the longitudinal main groove formed extendedly in the circumferential direction of the tire. Thus to reduce the air-column resonated sound, it is favorable to adopt a method of imparting resistance to air flowing in the longitudinal main groove to prevent the air from flowing smoothly.

In consideration of the above-described point, a pneumatic tire is proposed, as disclosed in Japanese Patent Application Laid-Open No. 10-315711 (patent document 1). In the pneumatic tire shown in FIG. 18, a plurality of slots 4 is formed on the side surface 2a of the longitudinal main groove 2 in the circumferential direction of the tire (rotational direction of tire).

It is described in paragraph 33 of the specification that preferably, the slots 4 are not formed on the tread surface and spaced at certain intervals from the bottom surface of the longitudinal main groove. Thus the small slots 4 are concavely formed on the side surface 2a of the longitudinal main groove 2. As shown in FIG. 18, the slots 4 are rectangular in the sectional configuration thereof, and the edge is formed at the boundary between the bottom surface of the longitudinal main groove and the side surface thereof.

In the construction disclosed in the patent document 1, because air flowing through the longitudinal main groove also flows into the slots, it is possible to reduce the flow speed of the air flowing through the longitudinal main groove and prevent a clear air column from being generated.

However, the slots formed on the longitudinal main groove are not continuous with the grounding surface of the tread surface nor the longitudinal main groove. Therefore the construction of the pneumatic tire has a disadvantage of allowing water which has collected in the slots to be drained easily. The slots are rectangular in the sectional configuration thereof, and the edge is formed at the boundary between the bottom surface of the longitudinal main groove and the side surface thereof. Therefore it is difficult to drain water from the slots. It is preferable that the water which has been drained from the longitudinal main groove formed on the tread surface flows to the outer side of the tire in its widthwise direction thereof. Because the slots are formed on both side surfaces of the longitudinal main groove, the water is also drained to the inner side of the tire in the widthwise direction thereof. Thus there is a possibility that the drained water penetrates into the longitudinal main groove again.

As described above, in the pneumatic tire disclosed in patent document 1, it is possible to reduce the air-column resonated sound generated in the longitudinal main groove, but the pneumatic tire has a low degree of draining performance. Thus the pneumatic tire does not have both the anti-aquaplaning performance and the noise-reducing performance and leaves room improvement.

SUMMARY OF THE INVENTION

The present invention has been made in view of the above-described problems. Therefore it is an object of the present invention to provide a pneumatic tire having both anti-aquaplaning performance and noise-reducing performance.

To solve the above-described problems, the present invention provides a pneumatic tire including a longitudinal main groove formed concavely on a tread surface thereof in a radial direction thereof by extending the longitudinal main groove linearly in a circumferential direction thereof; and narrow grooves formed concavely on at least an outer side surface of both side surfaces of the longitudinal main groove opposed to each other in a widthwise direction of the pneumatic tire, with a bottom surface of the longitudinal main groove interposed between the both side surfaces by spacing the narrow grooves at certain intervals in a circumferential direction of the pneumatic tire. Each of the narrow grooves is so configured that a longer side of each of the narrow grooves extends in the radial direction of the pneumatic tire or in the same direction as a depth direction of the longitudinal main groove and that a shorter side of each of the narrow grooves extends in the circumferential direction of the pneumatic tire orthogonal to the radial direction of the pneumatic tire. A sectional configuration of a position having a maximum sectional area in each of the narrow grooves is circular arc-shaped.

The tread surface means the surface of the pneumatic tire that contacts a road surface while a vehicle is traveling. The present invention includes the construction in which at least one longitudinal main groove is provided on the grounding surface in the circumferential direction of the tire. As described previously, the more the longitudinal main groove is, the bigger the air-column resonated sound becomes. Therefore the narrow groove provided on the tire to prevent generation of noise can be preferably adopted for the tire on which several longitudinal main grooves are formed.

The longitudinal main groove of the present invention is extended linearly. The longitudinal main groove curvedly extended on the tread surface reduces the flow speed of air flowing along the longitudinal main groove. Thus a clear air column is not generated, and hence the generation of the air-column resonated sound can be suppressed. But the longitudinal main groove curvedly extended on the grounding surface has a low degree of draining performance and is thus not adopted in the present invention. The "linear" specified in the present invention excludes a groove curved to make the flow of air low. But the present invention includes a groove curved at a small angle of not more than five degrees and a groove approximately linear.

In the above-described construction, the side surface of the longitudinal main groove is formed not as a flat smooth surface, but as an irregular surface by forming the narrow grooves on the side surface of the longitudinal main groove in the radial direction of the tire, namely, in the direction substantially orthogonal to the direction of air flowing in the longitudinal main groove. Therefore the air is prevented from flowing smoothly through the longitudinal main groove and hence a clear air column is not formed in the longitudinal main groove. Thereby it is possible to reduce the air-column resonated sound. Because narrow grooves are circular arc-shaped when they are viewed in a section orthogonal to the radial direction of the tire, water which has flowed into the narrow grooves does not stay inside the narrow grooves, but returns smoothly to the longitudinal main groove. Therefore the pneumatic tire has high draining performance and has both anti-aquaplaning performance and noise-reducing performance.

As described above, the narrow grooves do not necessarily have to be formed on opposed side surfaces of the longitudinal main groove, but may be formed on only one side surface thereof. In this case, the narrow grooves are formed on the outer side surface of the longitudinal main groove in the widthwise direction of the tire.

That is, the narrow grooves formed on only the one side surface of the longitudinal main groove are capable of reducing the speed of the air flowing in the longitudinal main groove and thereby the air-column resonated sound sufficiently.

The reason the narrow grooves are formed on only the outer side surface of the longitudinal main groove in the widthwise direction of the tire is because of the following reason: The air flows readily along the outer side surface of the longitudinal main groove in the widthwise direction of the tire. Thus the air flowing along the longitudinal main groove meets with a high resistance of the narrow grooves formed on the outer side surface of the longitudinal main groove in the widthwise direction of the tire. Thereby it is possible to reduce the air-column resonated sound efficiently.

When the narrow grooves are formed on the outer side surface of the longitudinal main groove in the widthwise direction of the tire, water that has penetrated into the narrow grooves is drained to the outer side of the tread surface of the tire in the widthwise direction thereof. This is preferable in terms of the anti-aquaplaning performance of the tire. Moreover, the tread pattern of the tire is simpler in the construction in which the narrow grooves are formed on only the outer side surface of the longitudinal main groove than in the construction in which the narrow grooves are formed on both side surfaces of the longitudinal main groove.

Therefore when a plurality of the longitudinal main grooves is formed at certain intervals on the tread surface in the widthwise direction of the pneumatic tire, it is preferable that the narrow grooves are formed on only the outer-side surface of each of the longitudinal main grooves disposed at left and right sides with respect to a central position in the widthwise direction of the pneumatic tire.

When a plurality of the longitudinal main grooves is formed at certain intervals on the tread surface in the widthwise direction of the pneumatic tire, the narrow grooves are formed on both side surfaces of the longitudinal main groove disposed at a central position in the widthwise direction of the pneumatic tire to drain water to both sides of the tire in its widthwise direction.

When the narrow grooves are formed on only one surface of one of a plurality of the longitudinal main grooves, it is preferable to form the narrow grooves on the above-described outer side surface of the longitudinal main groove disposed at the outer side of a vehicle. Thereby it is possible to improve the noise-reducing performance of the tire and the anti-aquaplaning performance thereof.

It is preferable that the length of each of the narrow grooves in the radial direction of the tire is set to not less than 50% nor more than 100% of the depth of the longitudinal main groove. If the length of each of the narrow grooves in the radial direction of the tire is set to less than 50%, the narrow grooves are incapable of applying a high resistance to the air flowing along the longitudinal main groove and hence incapable of contributing to reduction of the air-column resonated sound.

Most favorably, the length of each of the narrow grooves in the radial direction of the tire is 100% of the depth of the longitudinal main groove, supposing that the narrow grooves are formed in the range from the bottom surface of the longitudinal main groove to the upper end (grounding surface) of the side surface thereof.

When the narrow grooves are formed to the upper end (grounding surface) of the side surface of the longitudinal main groove, it is possible to drain sand, mud, and snow from the narrow grooves because the narrow grooves are formed to the grounding surface and hence prevent the narrow grooves from being clogged with them.

When the length of each of the narrow grooves in the radial direction of the tire is 100% of the depth of the longitudinal main groove, the bottom surface of each of the narrow grooves in the radial direction is circular arc-shaped, is continuous with an edge of the bottom surface of the longitudinal main groove and with the grounding edge of the tread surface, and the grounding edge of the side surface of the longitudinal main groove is formed continuously and linearly in the circumferential direction of the tire.

As described above, when the bottom surface of each narrow groove is also circular arc-shaped in the radial direction of the tire, and both ends of each narrow groove in the radial direction of the tire, namely, the depth of the narrow groove at its upper and lower ends is set to zero, with the bottom surface of each narrow groove continuous with the bottom surface of the longitudinal main groove and the grounding surface of the side surface of the longitudinal main groove, it is possible to prevent the narrow groove from cracking and drain water that has flowed into the narrow grooves and smoothly flow the water to the longitudinal main groove and the grounding surface.

The narrow grooves may be open at the grounding surface of the tread surface, and the depth of each of the narrow grooves may be decreased gradually toward the bottom surface of the longitudinal main groove without forming the bottom surface of the narrow groove in the shape of a circular arc in the radial direction of the tire.

It is preferable that the depth of each of the narrow grooves from the side surface of the longitudinal main groove is varied in the radial direction of the pneumatic tire in such a way that the maximum depth of each of the narrow grooves is set to not less than 0.2 mm nor more than 3.0 mm.

The depth of the narrow groove may be constant in the radial direction of the tire. But as described above, it is preferable that the depth of the narrow groove is changed in the radial direction of the tire. More specifically it is preferable that the depth of the narrow groove is decreased gradually toward the bottom surface of the longitudinal main groove without making the side edge of the bottom surface of the longitudinal main groove irregular so that the tire cracks at the side edge of the bottom surface of the longitudinal main groove.

If the maximum depth of each of the narrow grooves is set to less than 0.2 mm, the narrow grooves are incapable of applying a high resistance to the air flowing along the longitudinal main groove. Hence the narrow grooves are incapable of sufficiently reducing the speed of the air flowing along the longitudinal main groove and is hence incapable of reducing the air-column resonated sound. On the other hand, if the maximum depth of each of the narrow grooves is set to more than 3.0 mm, the water is prevented from smoothly flowing through the longitudinal main groove. In this case, the pneumatic tire has a low degree of draining performance.

The depth of each narrow groove is set to favorably not less than 0.7 mm and more favorably not less than 11.0 mm nor more than 3.0 mm, more favorably nor more than 2.5 mm and most favorably nor more than 2.0 mm.

It is preferable that the volume of each of the narrow grooves is set to 0.1 mm$^3$ to 180 mm$^3$. If the volumes of the narrow grooves are set to less than 0.1 mm$^3$, the narrow grooves are incapable of sufficiently contributing to reduction of the air-column resonated sound. On the other hand, if the volumes of the narrow grooves are set to more than 180 mm$^3$, the pneumatic tire has a low degree of draining performance.

As the width and depth of the longitudinal main groove become larger, the generated air column becomes increasingly large and hence the air-column resonated sound becomes increasingly large. Therefore it is preferable to form the narrow groove. On the other hand, as the width and depth of the longitudinal main groove become smaller and thus the volume thereof becomes smaller, the air column becomes increasingly small and hence the air-column resonated sound becomes increasingly small. Therefore it is unnecessary to take a measure of preventing the generation of noise by forming the narrow groove.

From the above-described standpoint, it is preferable that the narrow grooves are formed on the side surface of the longitudinal main groove having a width of not less than 2.0 mm nor more than 30.0 mm and a depth of not less than 5.0 mm nor more than 20.0 mm.

It is favorable that narrow grooves are concavely formed on the side surface of the longitudinal main groove in the circumferential direction of the pneumatic tire at pitches not less than 0.1 times nor more than 1.0 time the width of the longitudinal main groove.

If the pitch between adjacent narrow grooves is less than 0.1 times the width of the longitudinal main groove, the side surface of the longitudinal main groove is approximately linear. Thereby the narrow grooves are incapable of applying a high resistance to the air flowing along the longitudinal main groove. On the other hand, if the pitch is set more than 1.0 time the width of the longitudinal main groove, the degree of irregularity is so low that the narrow grooves are incapable of applying a high resistance to the air flowing along the longitudinal main groove. Unless the pitch is set not less than 0.1 times nor more than 1.0 time the width of the longitudinal main groove, the narrow grooves are incapable of sufficiently reducing the speed of the air flowing along the longitudinal main groove and is hence incapable of reducing the air-column resonated sound.

The pitch between adjacent narrow grooves is set to more favorably not less than 0.15 times and most favorably not less than 0.2 times the width of the longitudinal main groove. The pitch between adjacent narrow grooves is set to more favorably not more than 0.7 times and most favorably not more than 0.5 times the width of the longitudinal main groove.

The adjacent narrow grooves may be formed at regular pitches in the circumferential direction of the tire or irregular corresponding to continuous irregular pitch arrangement called valuable pitch.

It is possible to adjust the rigidity of the tread by altering the depth of the narrow groove, the length thereof, and the pitch between adjacent narrow grooves. Thereby it is possible to improve the degree of freedom in designing a tread pattern.

As the configuration of the narrow grooves that are open on the side surface of the longitudinal main groove, an elliptic configuration, oblong configuration, and a U-shaped or V-shaped configuration open to the grounding surface are more favorable than a rectangular configuration in the radial direction of the pneumatic tire. By making the side surface of the longitudinal main groove that contacts the air flowing irregular instead of linearly, a higher resistance can be applied to the air flowing along the longitudinal main groove.

It is preferable that each of the narrow grooves linearly extends in the range from an edge of the bottom surface of the longitudinal main groove to the grounding surface of the tread surface and that a portion of the side surface of the longitudinal main groove where the narrow grooves are not formed projects toward the opposed side surface of the longitudinal main groove. That is, when the narrow groove is formed on one side surface of the longitudinal main groove, the bottom surface (see 15a in FIG. 4 and other drawings) of the narrow groove and the other side surface of the longitudinal main groove are formed symmetrically, and the portion of the side surface of the longitudinal main groove where the narrow groove is not to be formed may be projected instead of forming the narrow groove concavely.

The above-described configuration has an advantage of reducing restrains in achieving high performance in designing a tread pattern and the performance of the tire.

The narrow grooves are concavely formed on both side surfaces of the longitudinal main groove symmetrically or zigzag in a circumferential direction of the pneumatic tire. That is, the narrow groove is formed to apply a resistance to the air flowing along the longitudinal main groove to reduce the flow speed thereof and prevent a clear air column from being generated. Therefore the positions of the narrow grooves can be set as desired from the standpoint of the design of the tread pattern.

As apparent from the foregoing description, according to the present invention, in the pneumatic tire having the longitudinal main groove formed on the tread surface thereof linearly in the circumferential direction thereof, the side surface of the longitudinal main groove is formed not as a flat smooth surface, but as an irregular surface by forming the narrow grooves on the side surface of the longitudinal main groove in the radial direction of the tire, namely, in the direction substantially orthogonal to the direction of air flowing in the longitudinal main groove. Therefore the air flowing in the longitudinal main groove encounters a high friction resistance from the side surface of the longitudinal main groove. As a result, the air is prevented from flowing smoothly through the longitudinal main groove. Thereby the flow speed of the air passing though the longitudinal main groove is low. Consequently a clear air column is not formed in the longitudinal main groove. Thus it is possible to reduce the air-column resonated sound and hence make a low noise.

Because narrow grooves are circular arc-shaped in a sectional configuration, water which has flowed into the narrow grooves does not stay there, but returns smoothly to the longitudinal main groove. Therefore the pneumatic tire has high anti-aquaplaning performance.

When the narrow grooves are formed to the grounding surface of the side surface of the longitudinal main groove, it is possible to drain sand and snow easily from the narrow grooves. When the narrow grooves are formed to the grounding surface of the side surface of the longitudinal main groove, the number of edges of the tread pattern increases. Thus the pneumatic tire has improved braking performance and driving performance when a road is muddy or snowy.

BRIEF DESCRIPTION OF THE DRAWINGS

FIG. 4 shows the first longitudinal main groove, in which

FIG. 5 shows the narrow groove, in which

DETAILED DESCRIPTION OF THE PREFERRED EMBODIMENTS

The embodiments of the present invention will be described below with reference to drawings.

FIGS. 1 through 5 show a first embodiment of the present invention.

Figure 1:
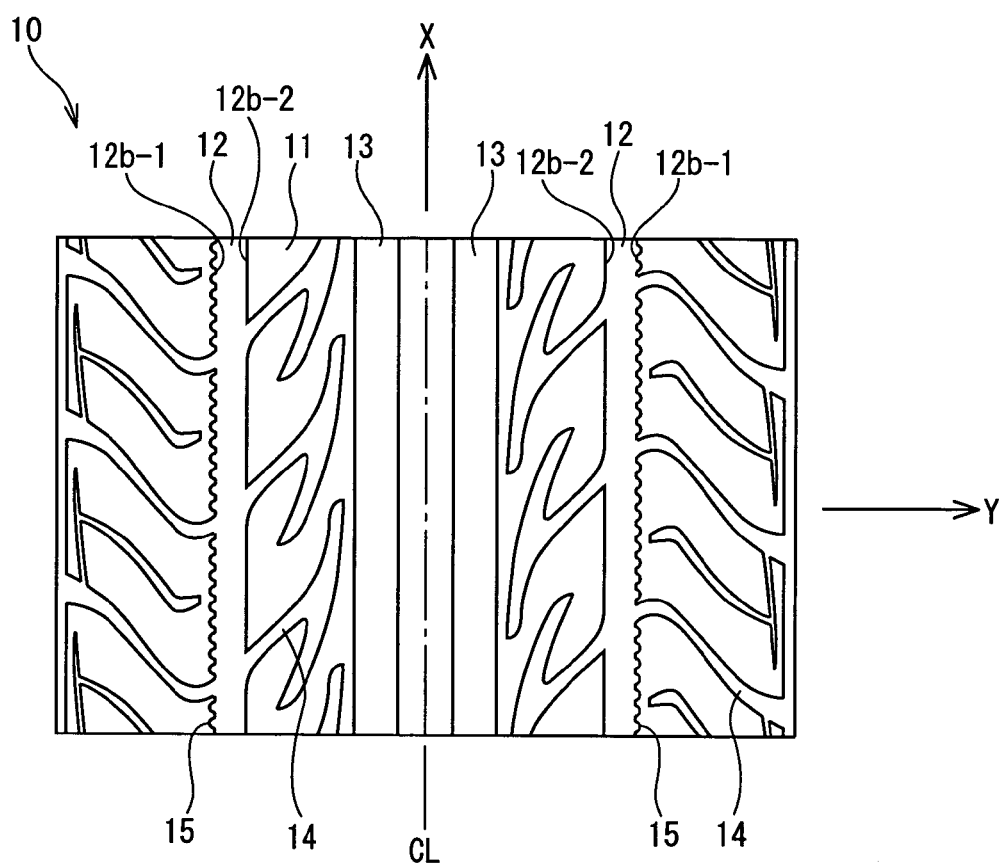
FIG. 1 shows a tread pattern of a pneumatic tire according to a first embodiment of the present invention.
Figure 2:
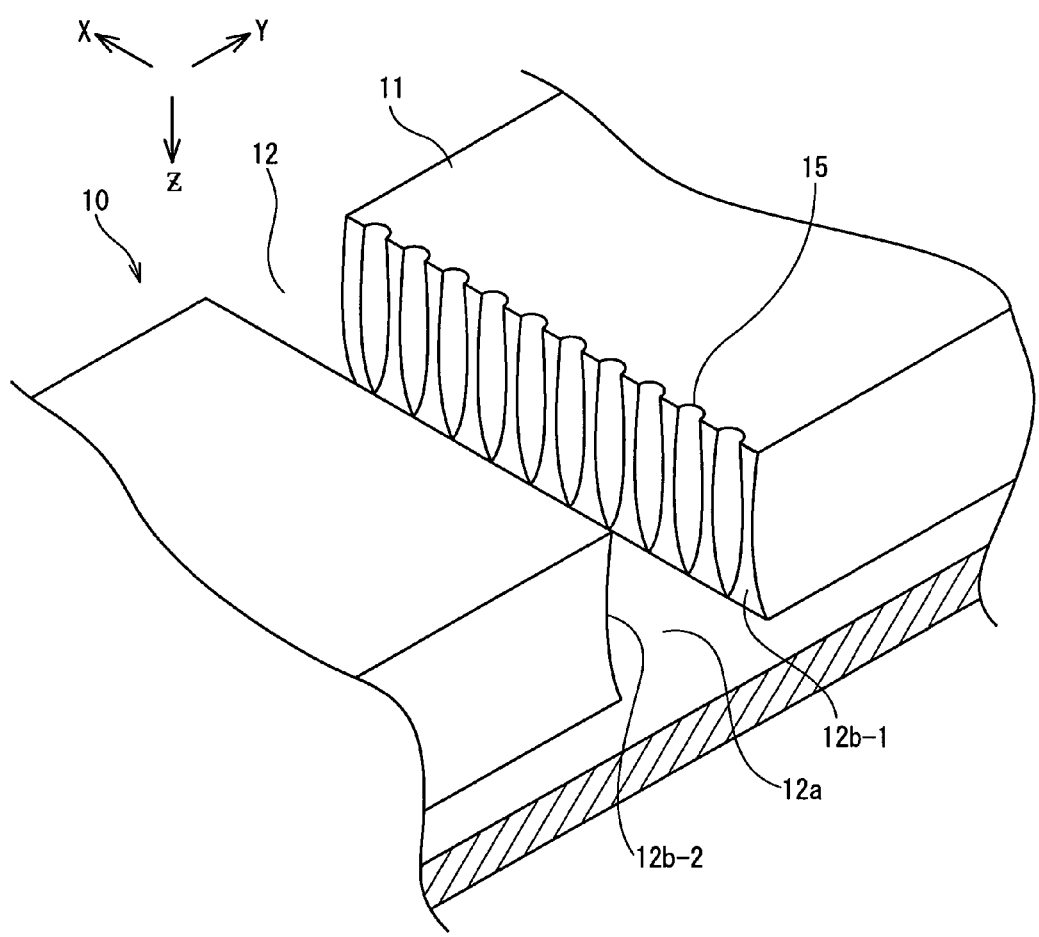
FIG. 2 is a main portion-depicted enlarged perspective view showing a first longitudinal main groove.

FIG. 1 shows the tread pattern of a pneumatic tire 10 (hereinafter often referred to as merely tire 10) of the first embodiment. Two annular first longitudinal main grooves 12 and two annular second longitudinal main grooves 13 are extended linearly on a tread surface 11 of the tire 10 in the circumferential direction X thereof. The two first longitudinal main grooves 12 and the two second longitudinal main grooves 13 are disposed symmetrically respectively with respect to the center line (equatorial line) CL in the widthwise direction of the tire 10. More specifically, the second longitudinal main grooves 13 are disposed at a central portion of the tire 10 in the widthwise direction thereof, and the first longitudinal main grooves 12 are disposed at left and right sides of the tread surface 11 in the widthwise direction of the tire 10. A plurality of lateral grooves 14 having a predetermined pattern is formed on the tread surface 11, with the lateral grooves 14 intersecting with the first longitudinal main grooves 12. The tread surface means the surface of the pneumatic tire 10 that contacts a road surface while a vehicle is traveling.

As shown in FIG. 4, each of the first longitudinal main grooves 12 disposed at both sides of the tread surface 11 in its widthwise direction includes a bottom surface 12a and a side surface 12b disposed at both sides of the bottom surface 12a. In the first embodiment, a width H1 of the grounding surface of the tire 10 in its widthwise direction Y (direction in which the rotational shaft of the tire extends) is set to 10.0 mm, and a depth H2 of the tire 10 in its radial direction is set to 8.2 mm.

The width and depth of each of the second longitudinal main grooves 13 disposed at the central portion of the tire 10 in its widthwise direction are set smaller than those of the first longitudinal main groove 12.

As shown in FIG. 1, in each of the first longitudinal main grooves 12 disposed at both sides of the tread surface 11 in the widthwise direction of the tire 10, narrow grooves 15 are formed on a side surface 12b-1 of the first longitudinal main groove 12 disposed at an outer side thereof in the widthwise direction of the tire 10 by extending the narrow grooves 15 in the radial direction Z of the tire 10. The narrow groove is not formed on a side surface 12b-2 of the first longitudinal main groove 12 opposed to the side surface 12b-1, but a flat surface is formed thereon.

The narrow groove is not formed on either of the side walls of each of the second longitudinal main grooves 13 disposed at the central portion of the tread surface 11 in the widthwise direction of the tire 10. But a flat surface is formed on both side walls of each second longitudinal main groove 13.

Figure 3A:
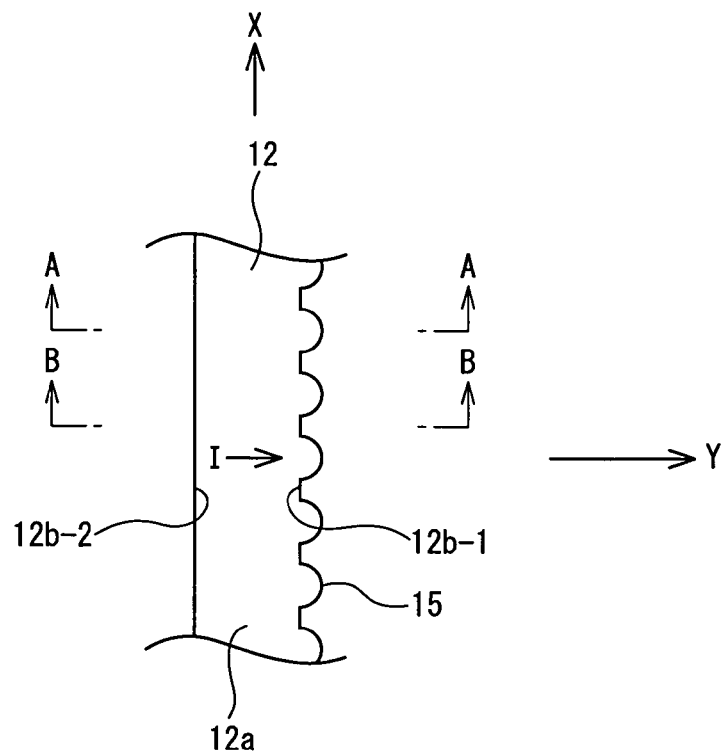
FIG. 3A is a plan view showing the first longitudinal main groove.
Figure 3B:
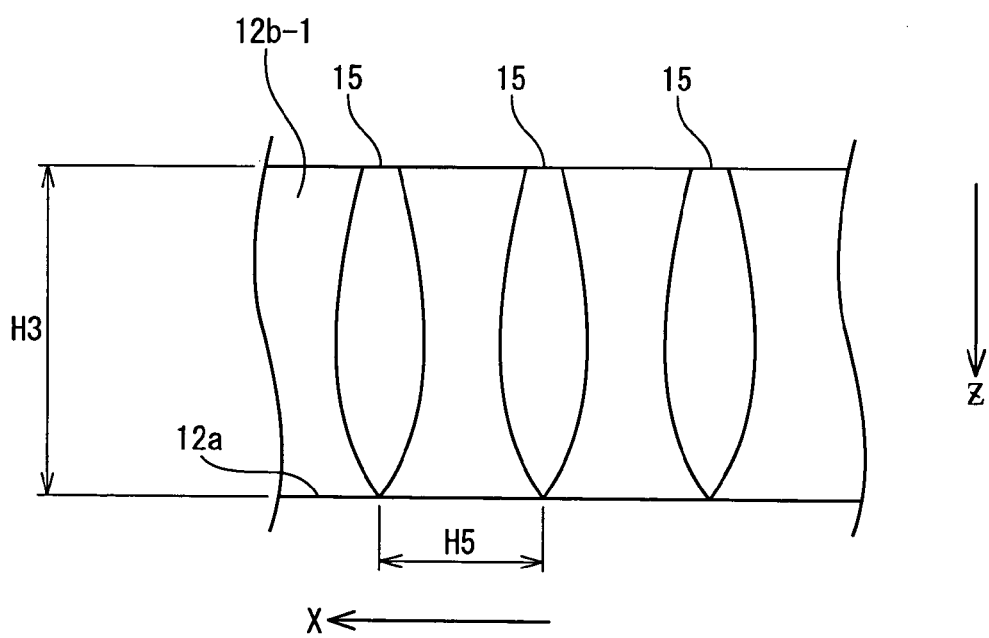
FIG. 3B shows a side surface of the first longitudinal main groove on which a narrow groove formed.

As shown FIGS. 3A and 5, the narrow groove 15 seen in a plan view of the tire 10 and seen in the direction orthogonal to the radial direction Z thereof is approximately circular arc-shaped or semicircular. As shown in FIG. 3B, when the narrow groove 15 is seen frontward (in the direction shown with an arrow I in FIG. 3A), the narrow groove 15 having the shape of a long narrow ellipse in the radial direction Z of the tire 10 is formed on the side surface 12b-1. An edge of the ellipse is not disposed at the grounding surface side (upper side in the drawing) of the narrow groove 15, but a portion having a smaller diameter is disposed at the grounding surface of the narrow groove 15 to allow the narrow groove 15 to contact the ground in a small area.

Figure 4A:
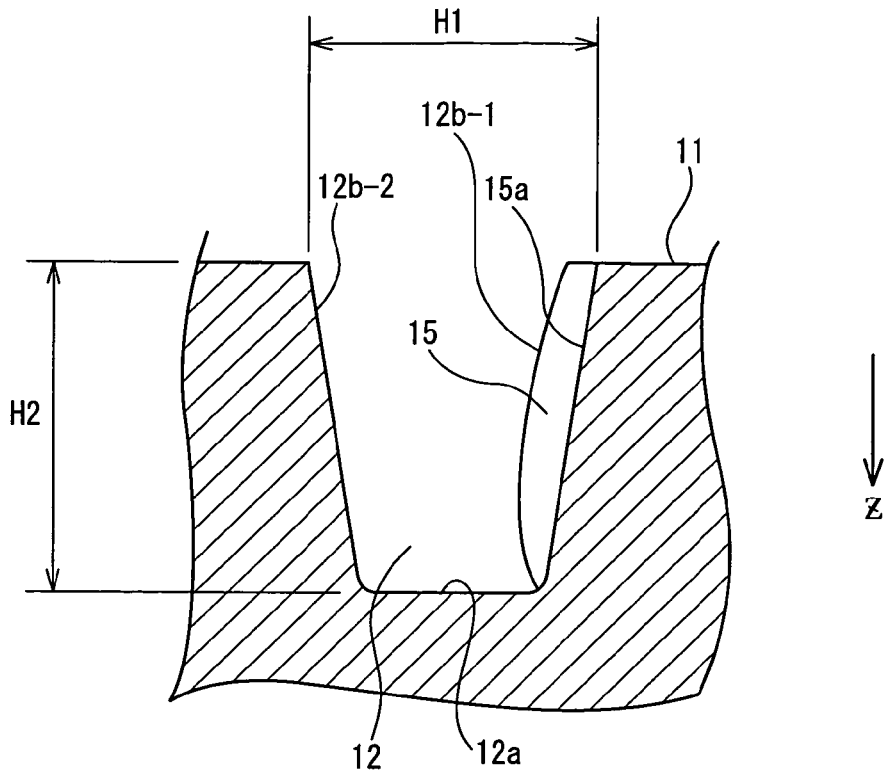
FIG. 4A is a sectional view taken along a line A-A of FIG. 3A.

As shown in FIG. 4A, the bottom surface 15a of the narrow groove 15 extends linearly from an edge of the bottom surface 12a of the first longitudinal main groove 12 to the grounding surface of the tire 10, with the bottom surface 15a of the narrow groove 15 forming a certain angle with respect to the bottom surface 12a of the first longitudinal main groove 12. Thus the bottom surface 15a of the narrow groove 15 is formed over the full length of the tire 10 in its radial direction Z. That is, a length H3 (see FIG. 3B) of the narrow groove 15 in the radial direction Z of the tire 10 is set equally (100%) to the depth H2 of the first longitudinal main groove 12. The bottom surface 15a of the narrow groove 15 and the side surface 12b-2 of the first longitudinal main groove 12 are formed symmetrically with respect to the center line of the bottom surface 12a of the first longitudinal main groove 12 in its widthwise direction.

Figure 4B:
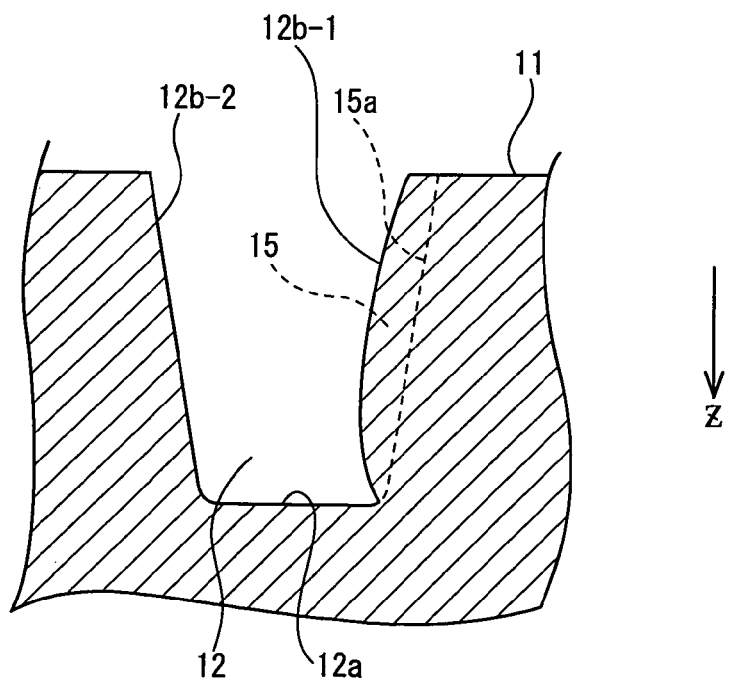
FIG. 4B is a sectional view taken along a line B-B of FIG. 3A.

Therefore as shown in FIG. 4B, a portion of the side surface 12b-1 of the first longitudinal main groove 12 between the adjacent narrow grooves 15 is circular arc-shaped, i.e., the central portion of the side surface 12b-1 bulges in the radial direction Z of the tire 10. That is, the narrow grooves 15 are formed by cutting out the bulged side surface 12b-1 from the upper end thereof to the lower end thereof at regular intervals in such a way that the narrow grooves 15 are circular arc-shaped in the direction orthogonal to the radial direction of the tire, namely, in a horizontal sectional view.

As described above, the narrow groove 15 is so constructed that the narrow groove 15 becomes wider and deeper toward its center in the depth direction (radial direction) of the tire, that the lower apex of the narrow groove 15 contacts the bottom surface 12a whose edge is continuously linear; and that an open shallow concavity of the narrow groove 15 is formed on the grounding surface of the tire.

Figure 5A:
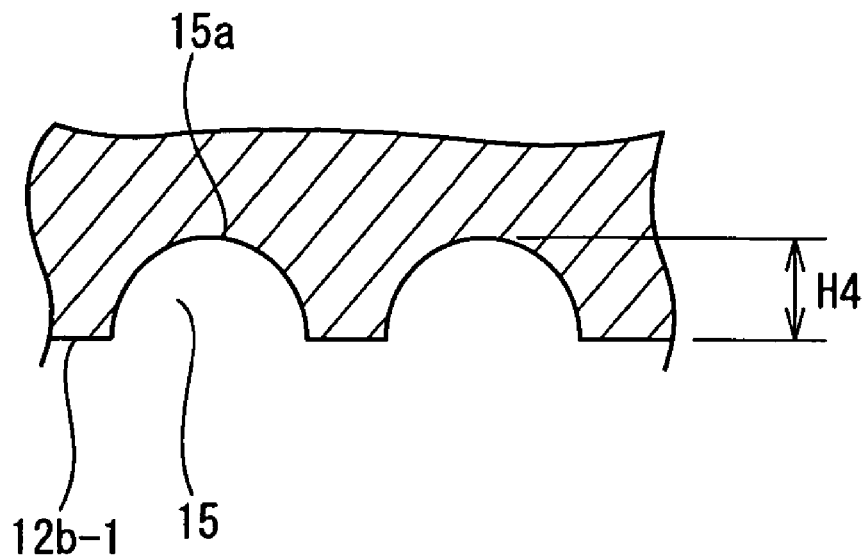
FIG. 5A is a sectional view showing a central portion of the narrow groove in a radial direction of the pneumatic tire.
Figure 5B:
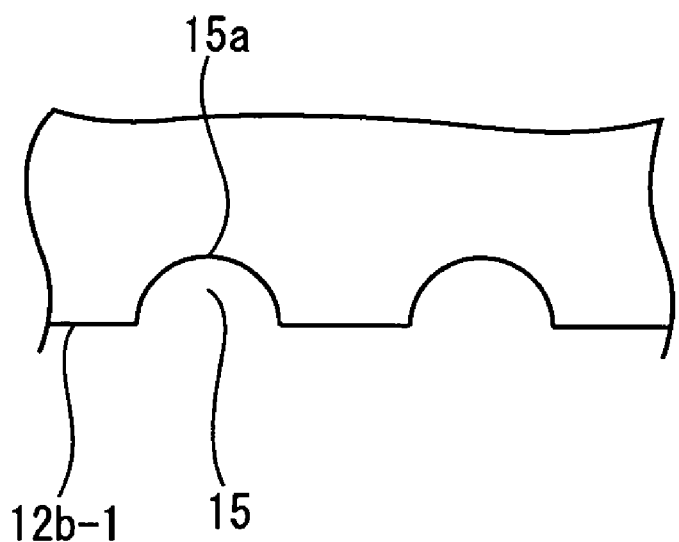
FIG. 5B is a view showing a grounding surface of the pneumatic tire.

FIG. 5A is a sectional view showing the central portion of narrow groove 15 in the radial direction Z of the tire. A depth H4 of the deepest portion of the narrow groove 15 is set to not less than 0.2 mm nor more than 3.0 mm. In the first embodiment, the depth H4 is set to 0.5 mm. FIG. 5B shows that the depth of the narrow groove 15 at its grounding surface is smaller than the depth thereof at its central portion.

A pitch H5 between the adjacent narrow grooves 15 in the circumferential direction X of the tire is set to not less than 0.1 nor more than 1.0 times the width H1 of the first longitudinal main groove 12. In the first embodiment, the pitch H5 is set to 1.5 mm that is 0.15 times the width H1 of the first longitudinal main groove 12.

According to the construction of the first embodiment, the side surface 12b-1 of the first longitudinal main groove 12 extended in the circumferential direction X of the tire is formed not as a flat smooth surface, but as an irregular surface by forming the narrow grooves 15 on the side surface 12b-1 of the first longitudinal main groove 12 in the radial direction Z of the tire, namely, in the direction substantially orthogonal to the direction of air flowing in the first longitudinal main groove 12. Therefore the air flowing in the first longitudinal main groove 12 encounters a high friction resistance from the side surface 12b-1 of the first longitudinal main groove 12. As a result, the air is prevented from flowing smoothly through the first longitudinal main groove 12. Thereby the flow speed of the air passing though the first longitudinal main groove 12 is low. Consequently a clear air column is not formed in the first longitudinal main groove 12. Thus it is possible to reduce the air-column resonated sound and hence make a low noise.

Because the sectional area of the first longitudinal main groove 12 is not reduced to generate a small air column in the first longitudinal main groove 12, the first longitudinal main groove 12 has a high draining performance and thus preferable anti-aquaplaning performance.

The narrow grooves 15 are formed on only the side surface 12b-1 of the first longitudinal main groove 12 disposed at the outer side thereof in the widthwise direction of the tire, whereas the narrow grooves 15 are not formed on the opposed side surface 12b-2 thereof. Therefore water that has flowed into the narrow grooves 15 is drained outward from the tire, and water inside the first longitudinal main groove 12 is drained outward from the tire through the narrow grooves 15. Thereby the water to be drained does not flow to the inner side of the tire in its widthwise direction. In this respect, this construction also enhances the anti-aquaplaning performance of the tire.

The narrow groove 15 is open on the grounding surface in a slight amount. Further the bottom surface 15a of the narrow groove 15 is circular arc-shaped in the radial direction of the tire and the direction orthogonal thereto. Thus no edge is formed at the boundary between the bottom surface 15a of the narrow groove 15 and the side surface thereof. Thereby water does not stay inside the narrow groove 15 but flows therefrom. In this respect, this construction also enhances the draining performance of the tire and hence accomplishes both reduction of the air-column resonated sound and draining performance.

Figure 6A:
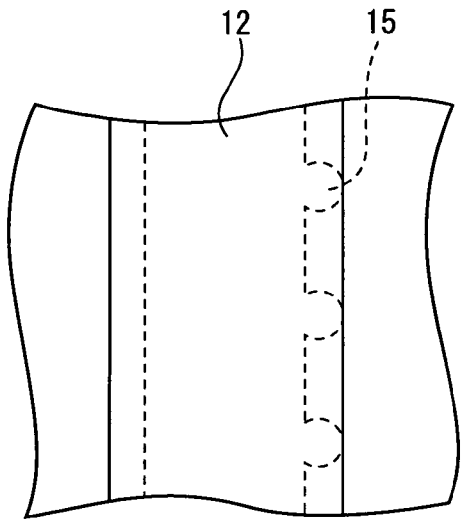
FIG. 6A is a partly enlarged view showing the tread pattern of a pneumatic tire according to a second embodiment of the present invention.
Figure 6B:
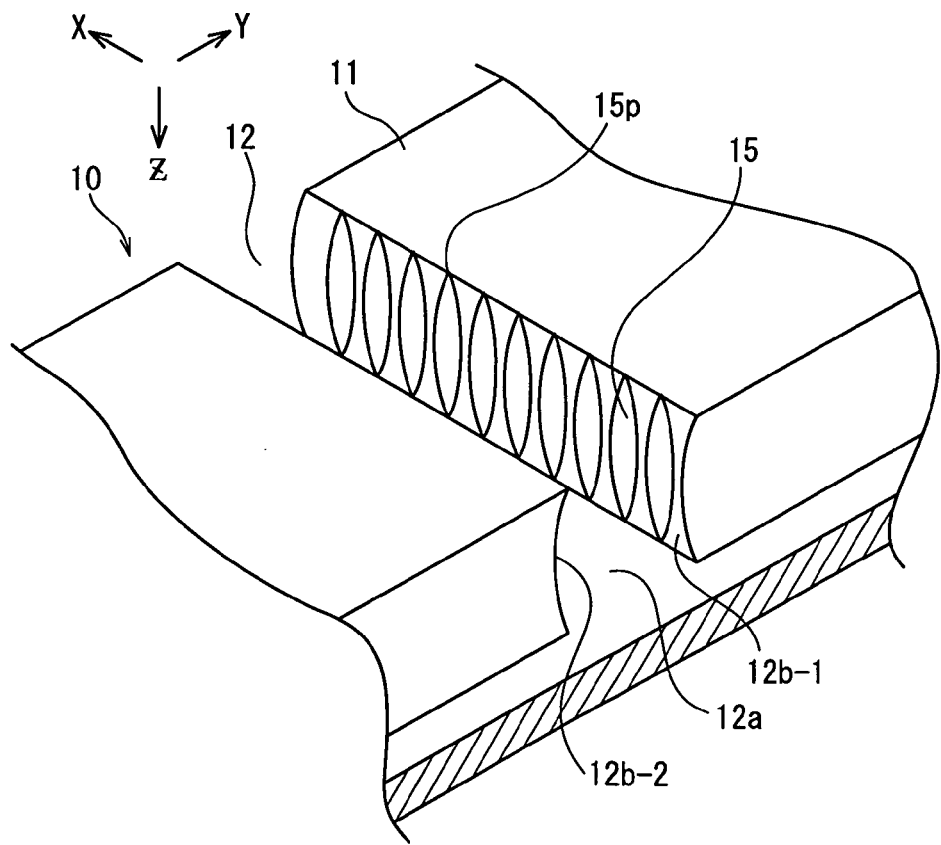
FIG. 6B is a partly enlarged view showing a first longitudinal main groove.
Figure 7:
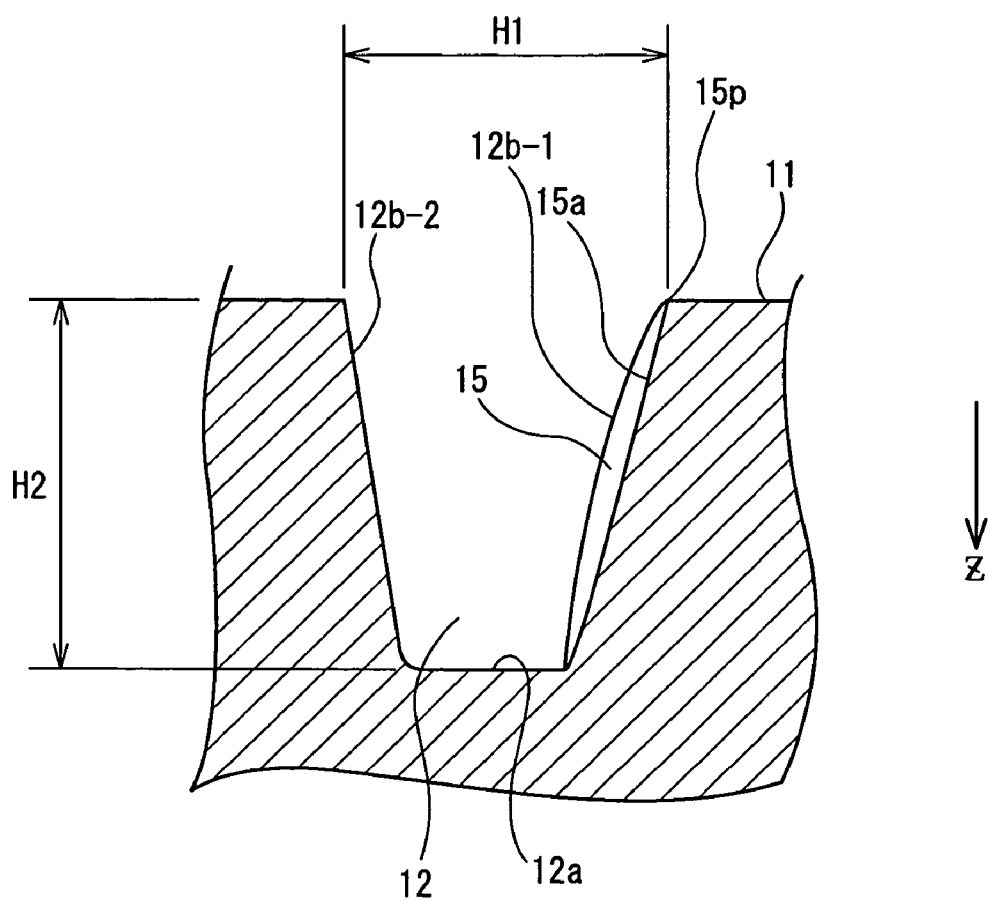
FIG. 7 is a sectional view showing a first longitudinal main groove of the second embodiment.

FIGS. 6 and 7 show the second embodiment. The second embodiment is different from the first embodiment in that the narrow groove 15 is not open at the grounding surface but an upper apex 15p of the elliptic narrow groove 15 is coincident with the grounding surface of the side surface 12b-1 of the first longitudinal main groove 12. Owing to the configuration of the narrow groove 15, the grounding surface of the side surface 12b-1 is not irregular but is straight. In the second embodiment, the side surface 12b-1 of the first longitudinal main groove 12 bulges gradually toward the bottom surface 12a thereof.

The second embodiment has the same construction as that of the first embodiment. Thus the same parts of the second embodiment as those of the first embodiment are denoted by the same reference numerals as those of the first embodiment, and description thereof is omitted herein.

Because the grounding surface of the side surface 12b-1 of the first longitudinal main groove 12 is straight, the tire does not crack readily. Further because the upper end 15p of the narrow groove 15 is extendedly formed to the position where the upper end 15p contacts the grounding surface of the side surface 12b-1 of the first longitudinal main groove 12, the narrow groove 15 has a function of draining water from the narrow groove 15 to the grounding surface.

Figure 8:
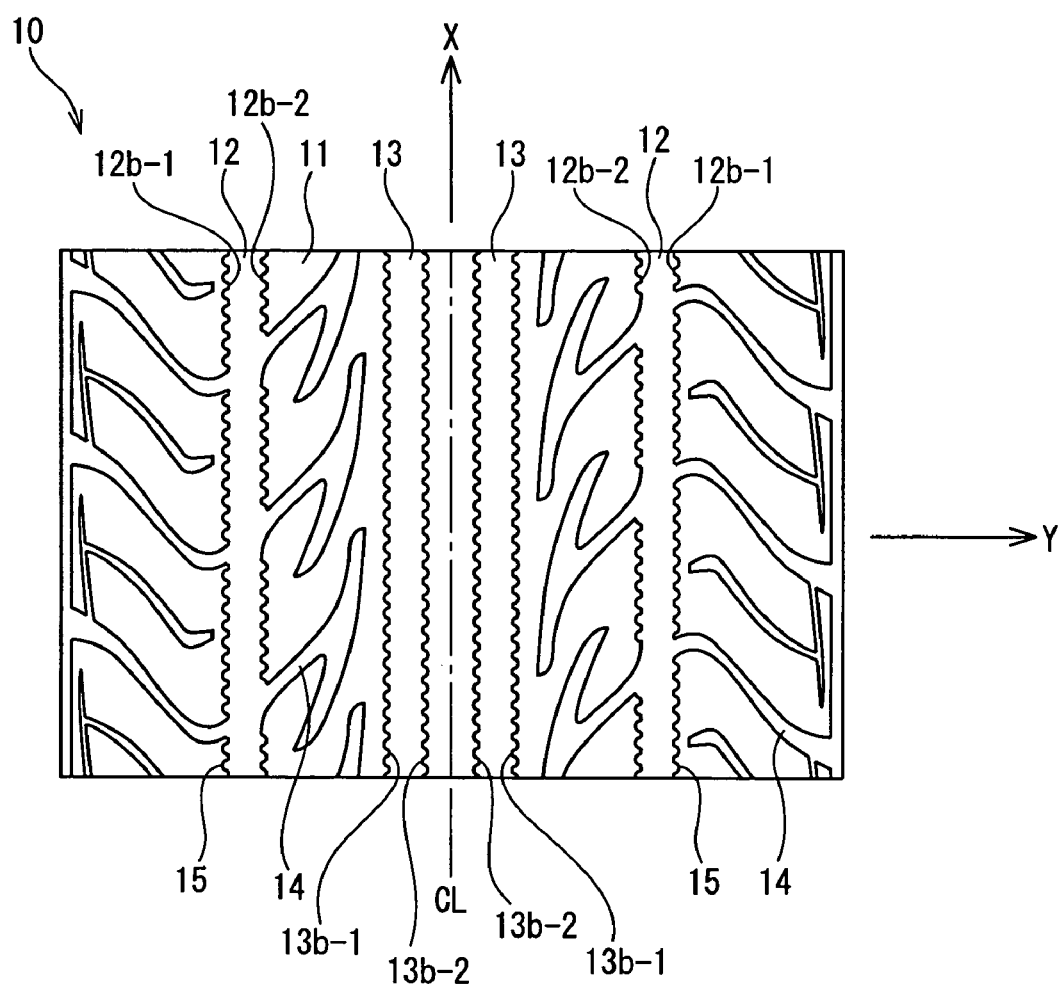
FIG. 8 shows the tread pattern of a third embodiment.
Figure 9:
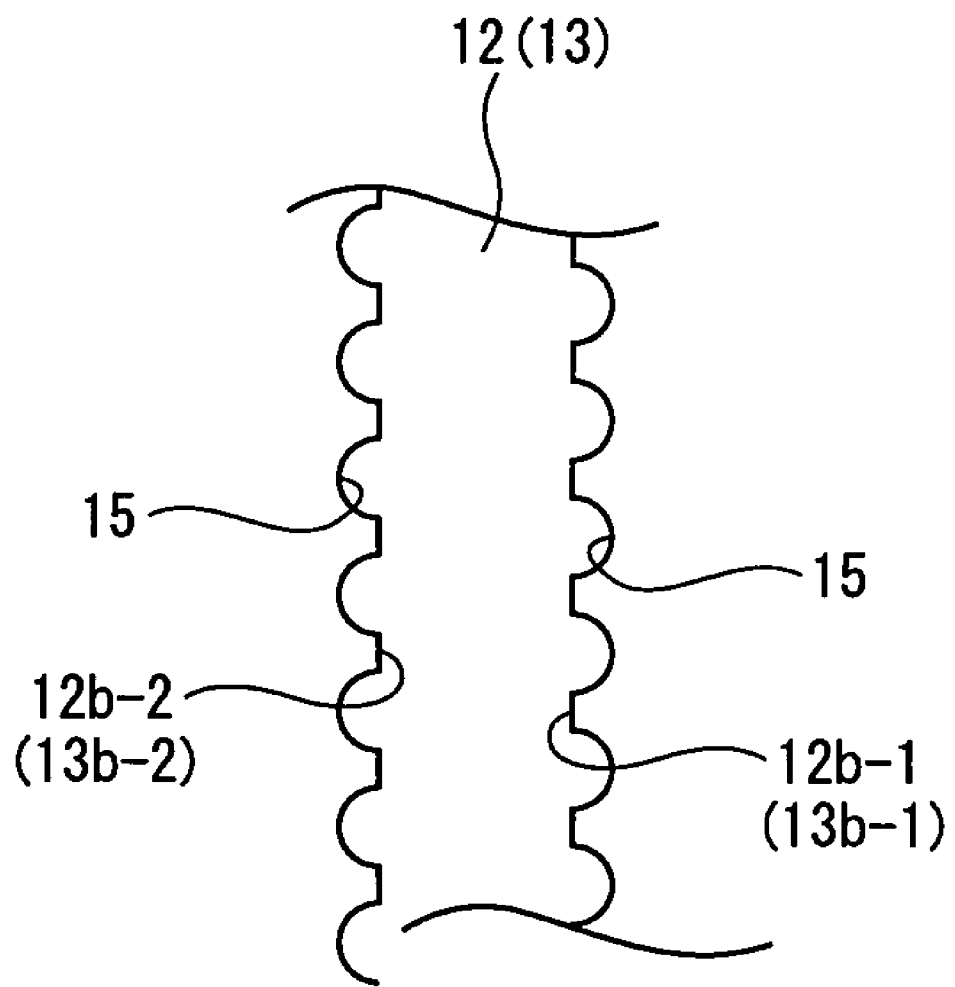
FIG. 9 is a plan view showing a first longitudinal main groove and a second longitudinal main groove of a third embodiment.

FIGS. 8 and 9 show the third embodiment. In the pneumatic tire of the third embodiment, two first longitudinal main grooves 12 and two second longitudinal main grooves are provided at the same positions as those of the first embodiment. In the pneumatic tire of the third embodiment, the narrow grooves 15 similar to that of the first embodiment are formed on all the side surfaces of the four longitudinal main grooves, namely, on both side surfaces 12b-1 and 12b-2 of each of the two first longitudinal main grooves 12 and both side surfaces 13b-1 and 13b-2 of each of the two second longitudinal main grooves 13. The narrow grooves 15 formed on the side surface 12b-1 (13b-1) and those formed on the side surface 12b-2 (13b-2) are not widthwise opposed, but are disposed zigzag, i.e., deviated from each other in the circumferential direction X of the tire, as shown in FIG. 8.

In this construction, the narrow grooves 15 are formed on the side surface of each of the two first longitudinal main grooves 12 and the two second longitudinal main grooves 13 all extended in the circumferential direction X of the tire. Therefore air does not flow smoothly in all of the first longitudinal main grooves 12 and the second longitudinal main grooves 13 when the vehicle travels. Thereby a clear air column is not formed inside the first longitudinal main grooves 12 and the second longitudinal main grooves 13 and hence the air-column resonated sound can be reduced.

Figure 10:
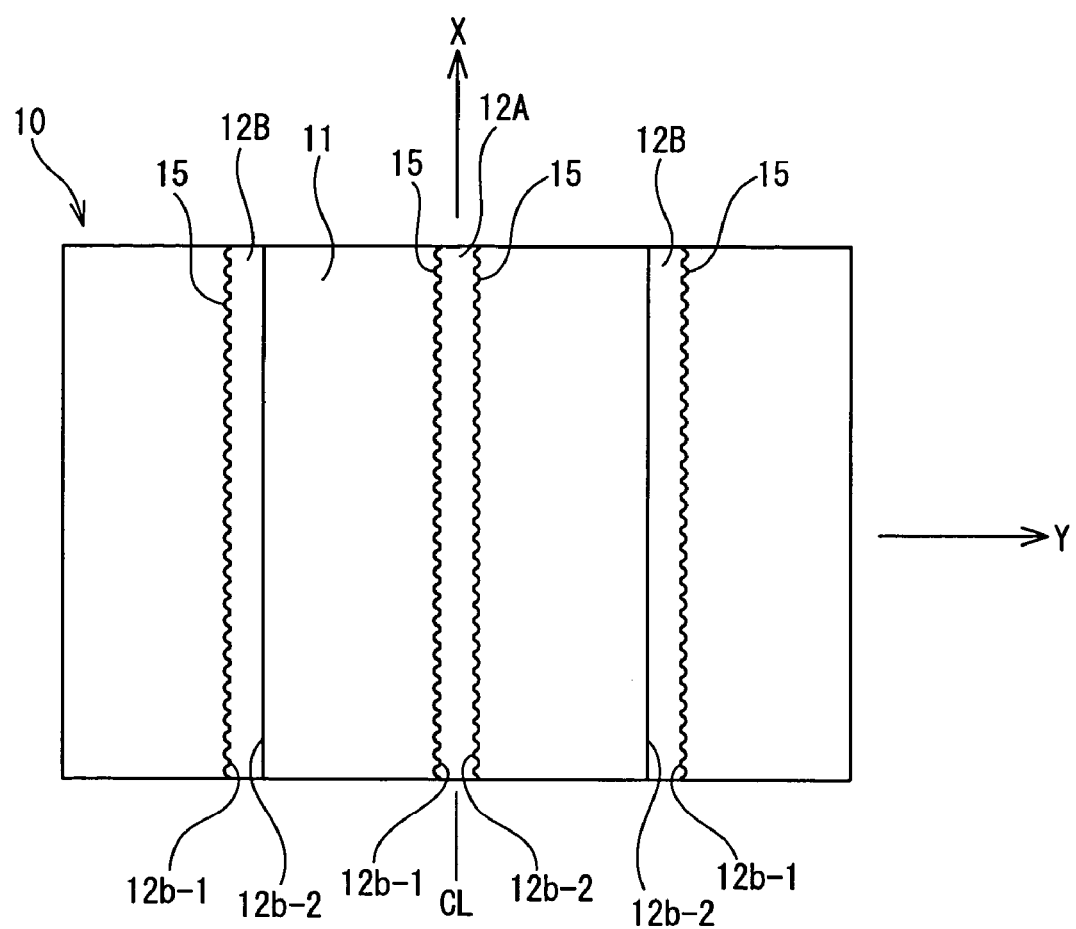
FIG. 10 is a schematic view showing the tread pattern of a pneumatic tire of a fourth embodiment.

FIG. 10 is a schematic view showing the tread pattern of the fourth embodiment of the present invention.

In the fourth embodiment, three longitudinal main grooves 12 are extendedly formed on the tread surface 11 in the circumferential direction X of the tire. One of the three longitudinal main grooves 12 is disposed on the equatorial line CL of the tire (center of the tire in its widthwise direction). The remaining two of the three longitudinal main grooves 12 are formed at a left-hand position and a right-hand position, with the two longitudinal main grooves 12 symmetrical with respect to the equatorial line CL. Similarly to the third embodiment, the narrow grooves 15 are formed zigzag on both side surfaces 12b-1 and 12b-2 of the central longitudinal main groove 12A. Similarly to the first embodiment, the narrow grooves 15 are formed on the outer side surface 12b-1 of the left-hand and right-hand longitudinal main grooves 12B.

The lateral grooves, similar to those shown in FIG. 1, which intersect with the first longitudinal main grooves 12 are not shown in FIG. 10.

The configuration of the narrow groove is the same as that of the narrow groove of the first embodiment. The pitch between the adjacent narrow grooves 15 in the circumferential direction X of the tire is also equal to that in the first embodiment. Thus the description thereof is omitted herein.

Similarly to the second longitudinal main groove 13 of the first embodiment, the narrow groove does not necessarily have to be formed on the central longitudinal main groove 12A. Similarly to the second embodiment, the narrow grooves may be formed zigzag on both side surfaces of the longitudinal main groove 12B disposed at both sides of the equatorial line CL.

The above-described construction provides an effect similar to that of the above-described embodiments. That is, the construction is capable of reducing the air-column resonated sound and maintaining the wet performance of the tire.

Figure 11:
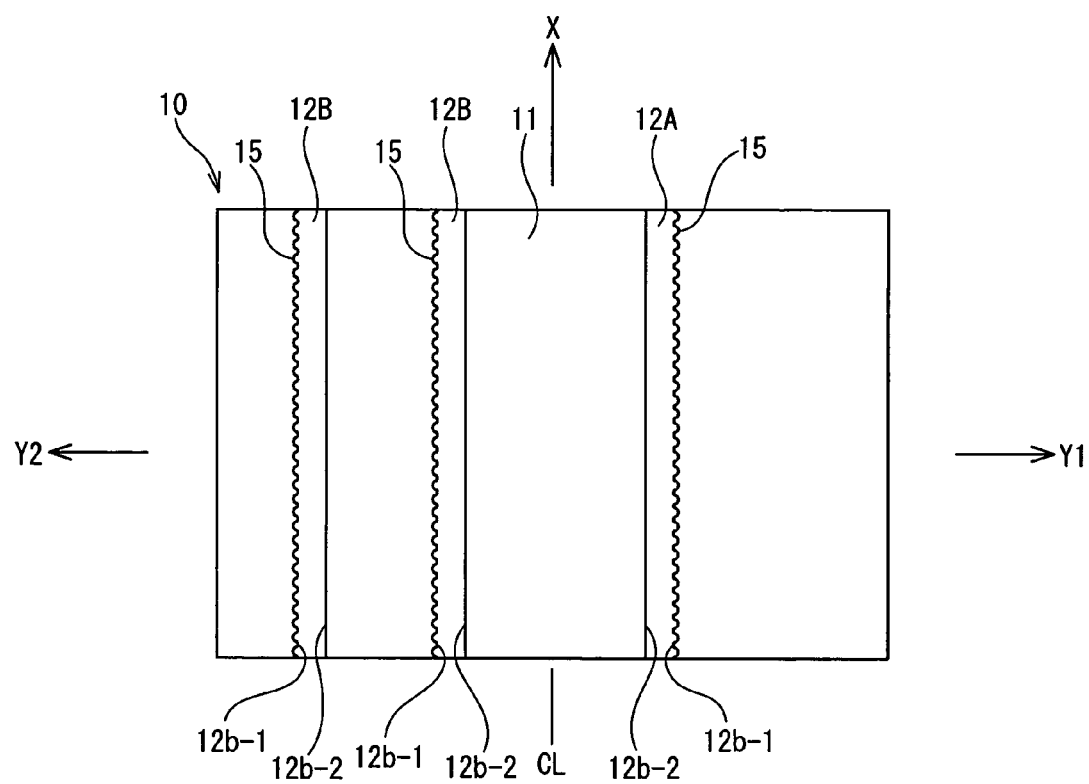
FIG. 11 is a schematic view showing the tread pattern of a pneumatic tire of a fifth embodiment.

FIG. 11 shows the fifth embodiment of the present invention.

In the fifth embodiment, similarly to the fourth embodiment, three longitudinal main grooves 12 are extendedly formed on the tread surface 11 in the circumferential direction X of the tire. The positions of the longitudinal main grooves 12 are different from those of the longitudinal main grooves 12 of the fourth embodiment. That is, the longitudinal main grooves 12 of the fifth embodiment are disposed not symmetrically in the widthwise direction Y of the tire, but disposed unsymmetrically.

More specifically, one longitudinal main groove 12A is disposed at an outer side Y1 (outer side of a vehicle when the pneumatic tire 10 is mounted thereon) with respect to the equatorial line CL of the tire. Two longitudinal main grooves 12B are disposed at an inner side Y2 (the central side of the vehicle when the pneumatic tire 10 is mounted thereon) with respect to the equatorial line CL of the tire. The distance between the equatorial line CL and the longitudinal main groove 12A disposed at the side Y1 with respect to the equatorial line CL of the tire is shorter than the distance between the equatorial line CL and the longitudinal main groove 12B of the fourth embodiment.

Similarly to the first embodiment, the narrow grooves 15 are formed on only the side surface 12b-1 of the longitudinal main grooves 12A and 12B disposed at the outer side thereof with respect to the equatorial line CL and not formed on the side surface 12b-2 of the longitudinal main grooves 12A and 12B disposed at the inner side thereof with respect to the equatorial line CL.

In the above-described construction, the large longitudinal main groove is not provided at the outer side Y1 (the outer side of the vehicle in the widthwise direction thereof) with respect to the equatorial line CL of the tire. Therefore the construction does not deteriorate the gripping performance of the tire. Two longitudinal main grooves 12 are disposed at the inner side Y2 (the inner side of the vehicle in the widthwise direction thereof) with respect to the equatorial line CL of the tire. Therefore the two longitudinal main grooves 12 is capable of securing draining performance. Similarly to the above-described embodiments, the construction is capable of reducing the noise caused by the air-column resonated sound.

Figure 12:
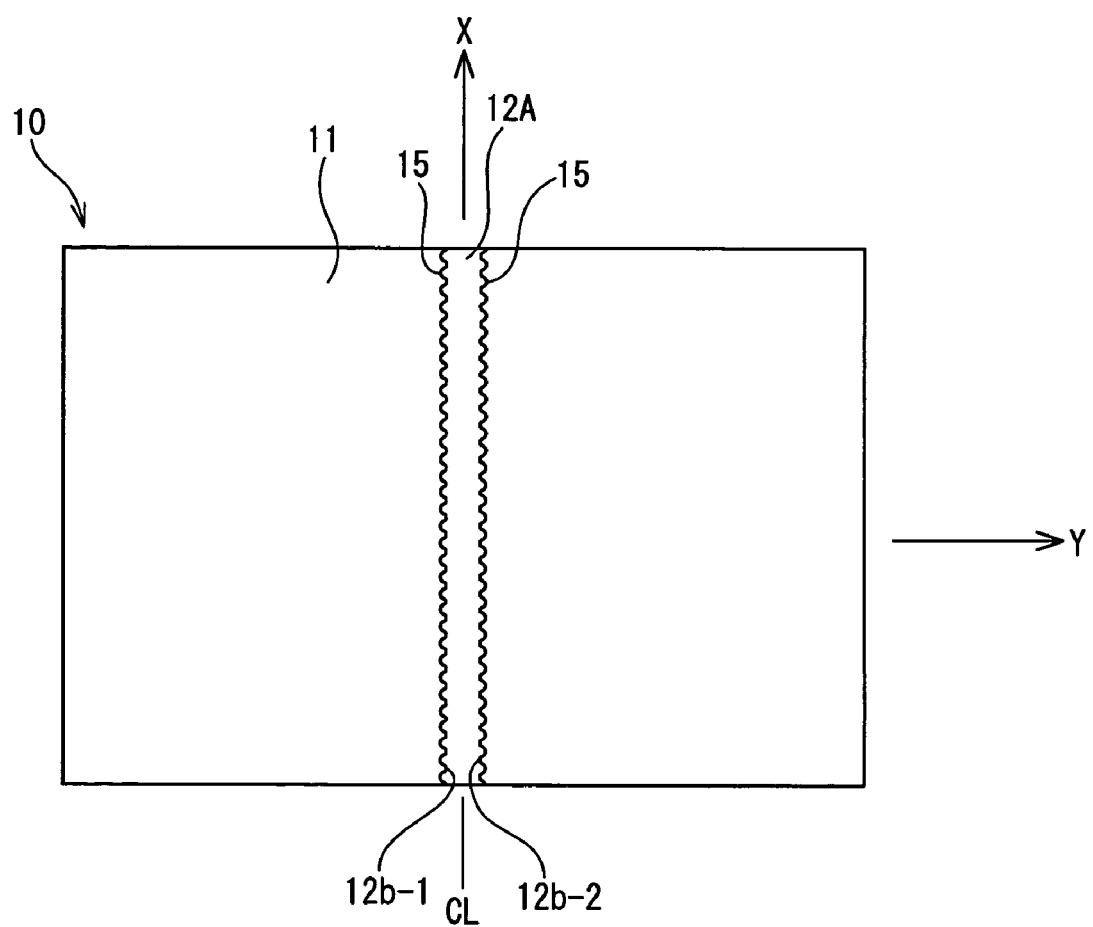
FIG. 12 is a schematic view showing the tread pattern of a pneumatic tire of a sixth embodiment.

FIG. 12 shows the sixth embodiment of the present invention.

In the sixth embodiment, one longitudinal main groove 12 is extendedly formed on the equatorial line CL (the center of the tire in the widthwise direction thereof) in the circumferential direction X of the tire. No other longitudinal main grooves are formed on the tread surface 11. Similarly to the fourth embodiment, the narrow grooves 15 are formed on both side surfaces 12b-1 and 12b-2 of the longitudinal main groove 12. Similarly to the above-described embodiments, the construction of the tire of the sixth embodiment is capable of reducing the noise caused by the air-column resonated sound.

Figure 13A:
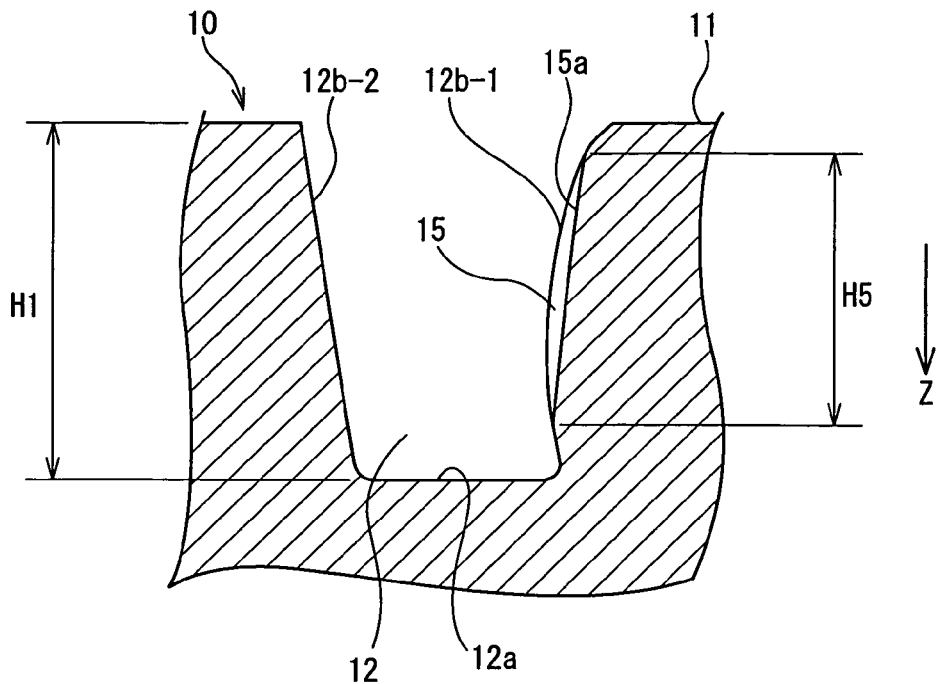
FIG. 13A through 13D show views of a seventh embodiment.
Figure 13B:
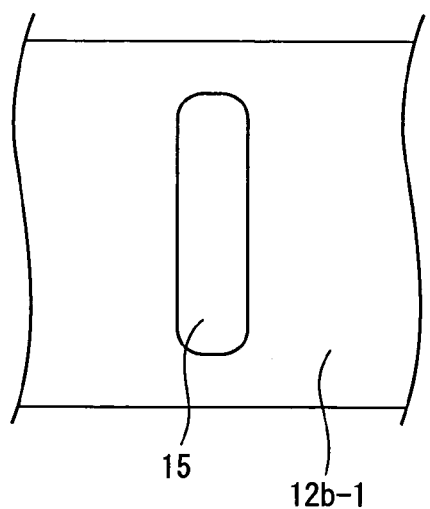
Figure 13C:
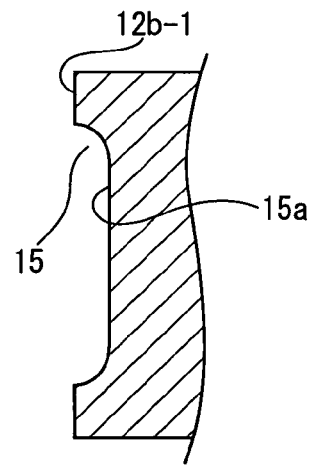

FIGS. 13A, 13B, and 13C show the seventh embodiment.

In the seventh embodiment, the configuration of the narrow groove 15 formed on the side surface 12b of the longitudinal main groove 12 by extending the narrow groove 15 on the tread surface 11 of the pneumatic tire 10 in the circumferential direction thereof is different from those of the above-described embodiments. That is, in the first through sixth embodiments, the narrow groove 15 is formed entirely from the upper end of the longitudinal main groove 12 to its lower end in the depth direction thereof (radial direction). In the seventh embodiment, the narrow groove 15 is formed not in the entire region of the longitudinal main groove 12 in the depth direction thereof, but only in the central portion in the depth direction thereof. In the seventh embodiment, the length H5 of the longitudinal main groove 15 in the radial direction Z of the tire is set to 5.0 mm which is 61.0% of the depth H2 (=8.2 mm) of the longitudinal main groove 12.

Figure 13D:
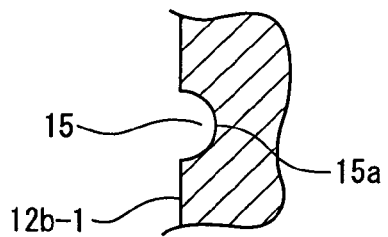

As shown in FIG. 13B, the opening of the narrow groove 15 on the side surface 12b-1 of the first longitudinal main groove 12 is oblong. Similarly to the narrow groove 15 of the first embodiment, the bottom surface 15a of the first longitudinal main groove 12 is circular arc-shaped in the radial direction of the tire, as shown in FIG. 13C and also circular arc-shaped in the direction orthogonal to the radial direction of the tire (section in the depth direction of the narrow groove 15) as shown in FIG. 13D.

In the seventh embodiment, similarly to the above-described other embodiments, the narrow groove 15 is formed on the side surface 12b-1 of the longitudinal main groove 12. Therefore the narrow groove 15 is capable of reducing noise caused by the air-column resonated sound. Because the upper end of the narrow groove 15 is not exposed on the tread surface 11, the narrow groove 15 does not adversely affect the appearance of the tread pattern and simplifies the design of the tire.

Figure 14A:
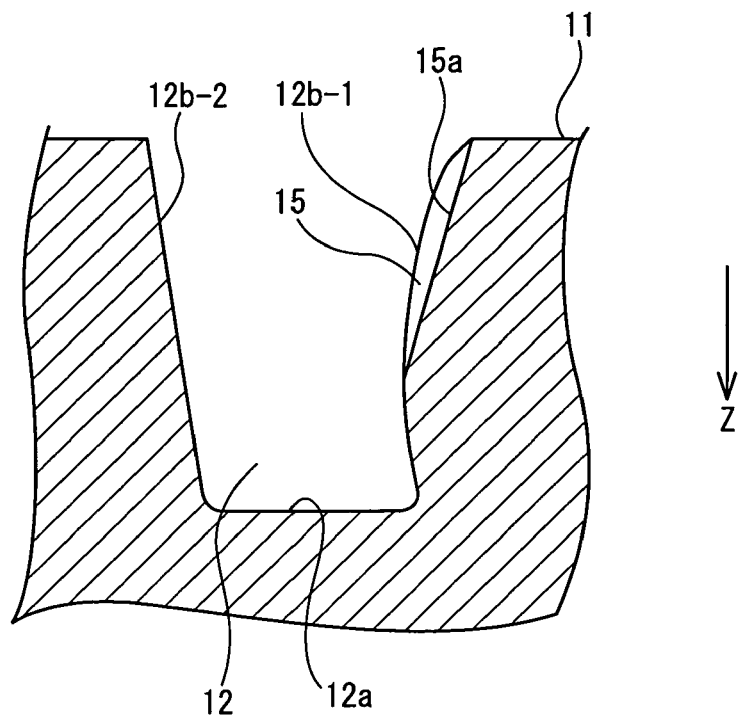
FIGS. 14A and 14B show a modification of the seventh embodiment.
Figure 14B:
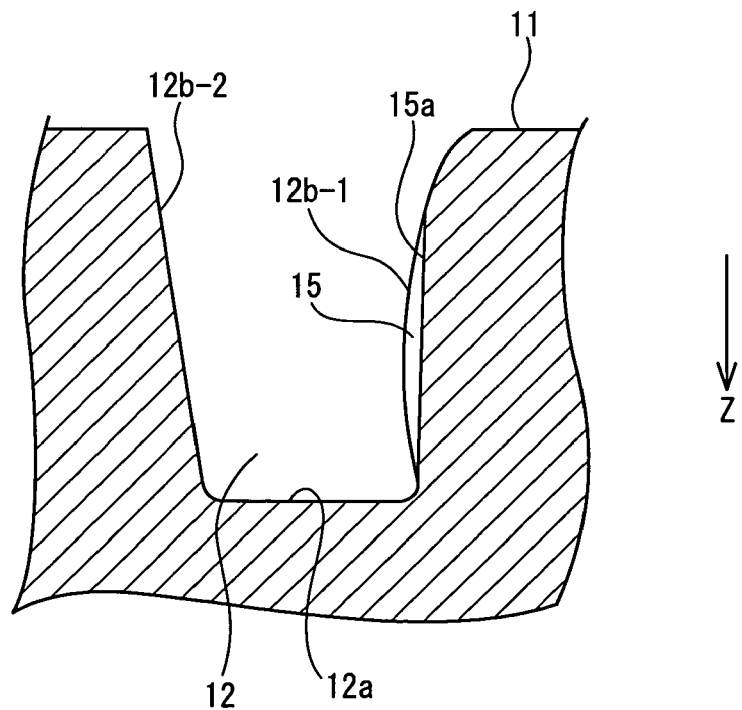

As shown in FIG. 14A, the narrow groove 15 may be formed at only the side of the opening of the longitudinal main groove 12. As shown in FIG. 14B, the narrow groove 15 may be formed at only the side of the bottom surface 12a of the longitudinal main groove 12.

Figure 15:
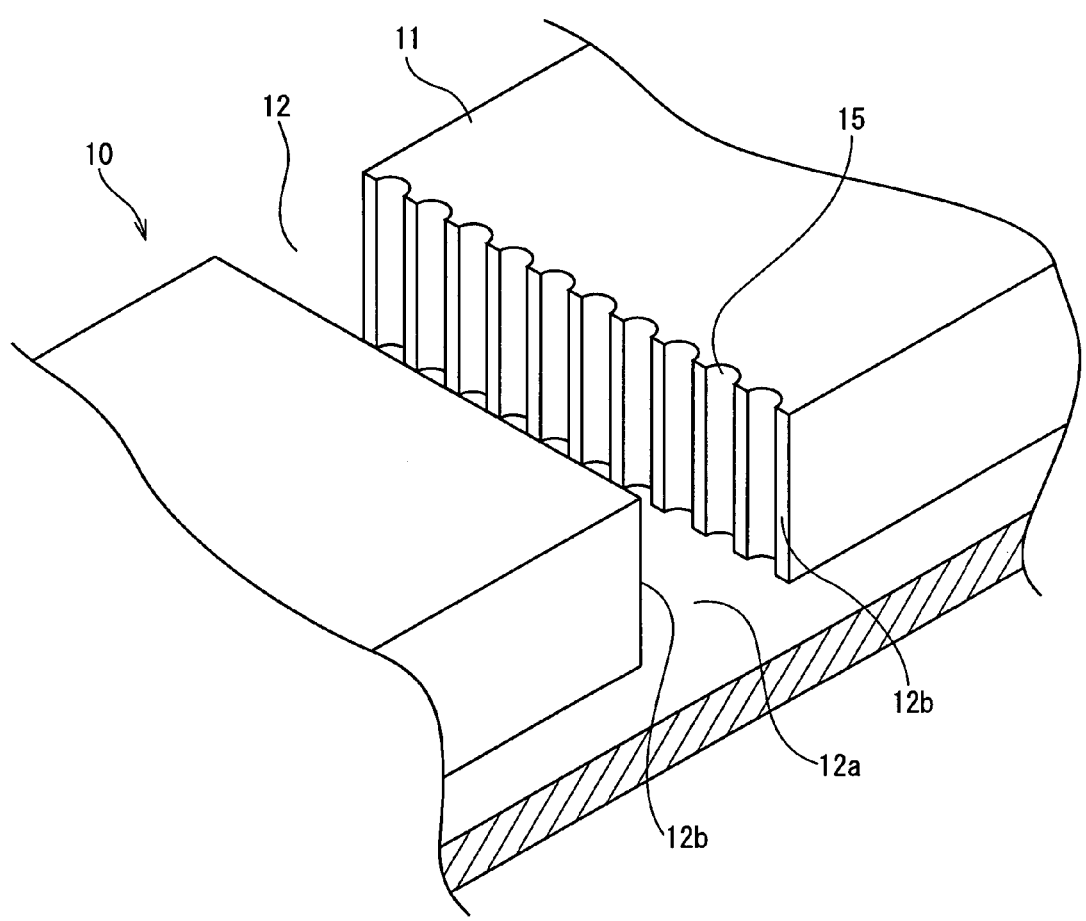
FIG. 15 shows an eighth embodiment.
Figure 16A:
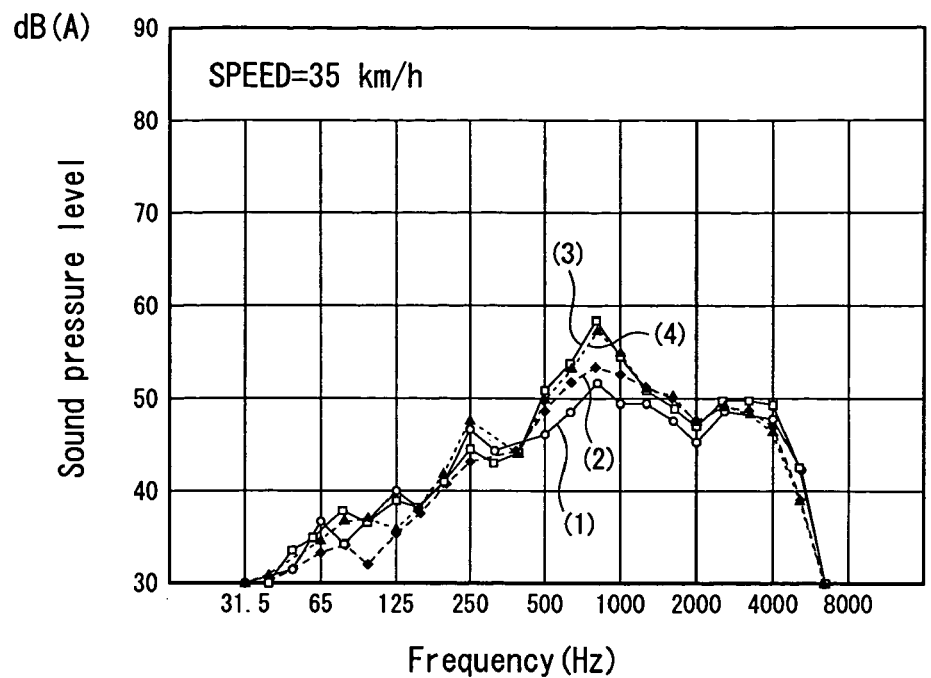
FIGS. 16A and 16B are graphs showing the relationship between a frequency of a tire-caused noise and a sound pressure level when a vehicle travels.
Figure 16B:
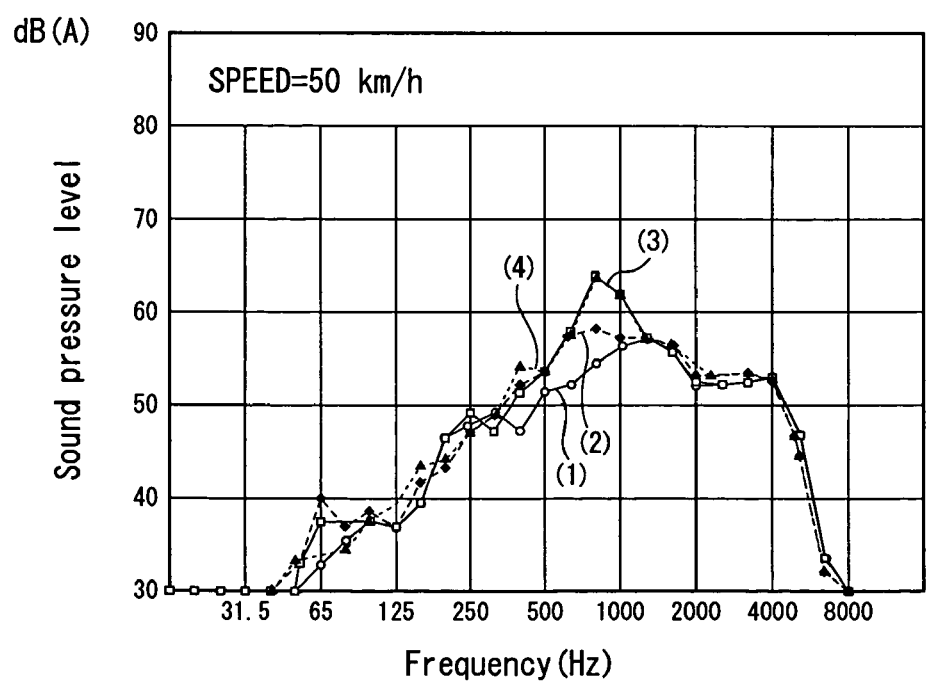
Figure 17A:
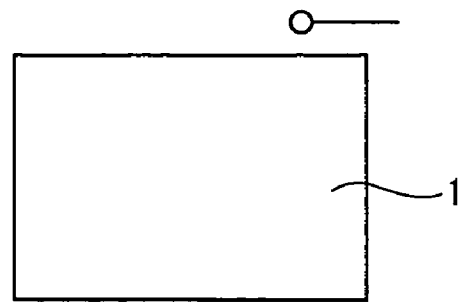
FIGS. 17A through 17D show tread patterns of a tire used in an experiment conducted to examine the relationship between a frequency of a tire-caused noise and a sound pressure level.
Figure 17B:
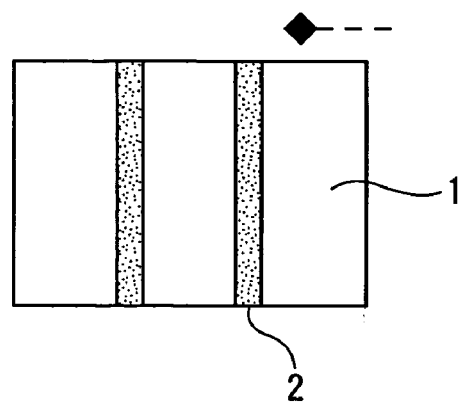
Figure 17C:
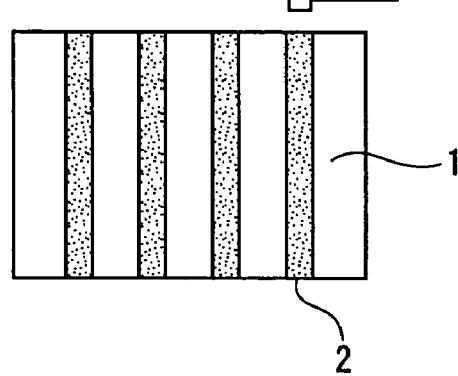
Figure 17D:
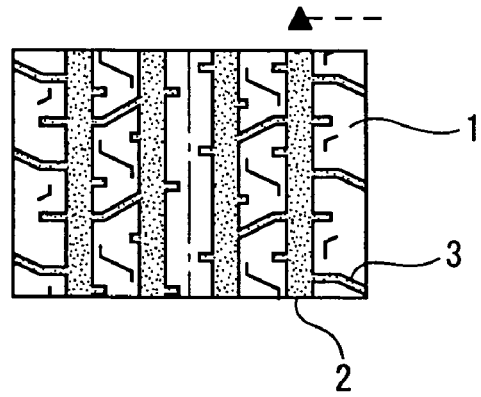
Figure 18:
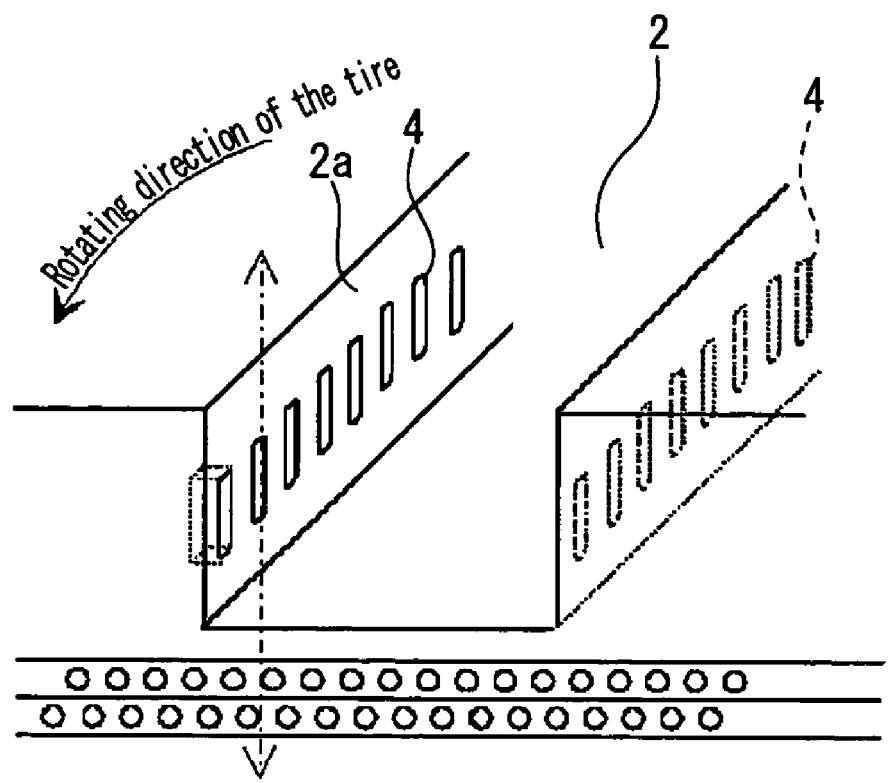
FIG. 18 shows a conventional art.

FIG. 15 shows the eighth embodiment.

The configuration of the narrow groove 15 of the eighth embodiment is different from those of the narrow grooves 15 of the above-described embodiments. That is, the narrow groove 15 is continuous in the shape of a semicircle having an equal radius from the grounding surface of the tread surface, namely, from the upper end thereof in the radial direction of the tire to the bottom surface 12a of the longitudinal main groove 12.

The examples of the pneumatic tire of the present invention and the comparison examples will be described below.

The size of the pneumatic tire of examples 1 through 20 and comparison examples 1 through 3 is all 195/65R15 91H and the rim size thereof is all 15×6-JJ. These pneumatic tires have the same tread pattern as that shown in FIG. 1. In these tires, the configurations of the side surfaces of the first longitudinal main grooves 12 extended in the circumferential direction of the tire are different from one another. More specifically, the following specifications of the narrow groove formed on the side surface of the first longitudinal main groove 12 were differentiated from one another: the depth of the narrow groove in the widthwise direction Y of the tire; the length thereof in the radial direction Z of the tire; the pitch between adjacent narrow grooves in the circumferential direction X of the tire; and the sectional configuration thereof; and the position thereof.

The noise-reducing performance and the anti-aquaplaning performance were measured on the tire of each of the examples 1 through 20 and the comparison examples 1 through 3 by a method described later.

Table 1 shows the construction and the result of measurement of each of the examples 1 through 20 and the comparison examples 1 through 3.

TABLE 1

|  | CE1 | E2 | E3 | E1 |
|---|---|---|---|---|
| Depth of narrow groove | — | 0.1 | 0.2 | 0.5 |
| Radial depth (mm) | — | 8.2 | 8.2 | 8.2 |
| Ratio = depth/depth of main groove (%) (depth of main groove = 8.2) | — | 100 | 100 | 100 |
| Pitch (mm) in equatorial direction | — | 1.5 | 1.5 | 1.5 |
| Pitch/width of main groove (Width of main groove = 10.0) | — | 0.15 | 0.15 | 0.15 |
| Sectional configuration | — | Semicircular | Semicircular | Semicircular |
| Disposition | — | One side Outer side of tire | One side Outer side of tire | One side Outer side of tire |
| Noise dB(A) inside vehicle body | ±0 | −0.1 | −0.3 | −0.9 |
| Anti-aquaplaning performance | 100 | 100 | 100 | 100 |

|  | E4 | E5 | E6 | E7 |
|---|---|---|---|---|
| Depth of narrow groove | 1.0 | 2.0 | 3.0 | 4.0 |
| Radial depth (mm) | 8.2 | 8.2 | 8.2 | 8.2 |
| Ratio = depth/depth of main groove (%) (depth of main groove = 8.2) | 100 | 100 | 100 | 100 |
| Pitch (mm) in equatorial direction | 1.5 | 1.5 | 1.5 | 1.5 |
| Pitch/width of main groove (Width of main groove = 10.0) | 0.15 | 0.15 | 0.15 | 0.15 |

TABLE 1-continued

|  | | | | |
|---|---|---|---|---|
| Sectional configuration | Semicircular | Semicircular | Semicircular | Semicircular |
| Disposition | One side | One side | One side | One side |
|  | Outer side of tire | Outer side of tire | Outer side of tire | Outer side of tire |
| Noise dB(A) inside vehicle body | −1.3 | −1.5 | −1.4 | −1.4 |
| Anti-aquaplaning performance | 100 | 99 | 99 | 97 |

|  | E8 | E9 | E10 | E11 |
|---|---|---|---|---|
| Depth of narrow groove | 0.5 | 0.5 | 0.5 | 0.5 |
| Radial depth (mm) | 2 | 4 | 5 | 7 |
| Ratio = depth/depth of main groove (%) (depth of main groove = 8.2) | 24.4 | 48.8 | 61.0 | 85.4 |
| Pitch (mm) in equatorial direction | 1.5 | 1.5 | 1.5 | 1.5 |
| Pitch/width of main groove (Width of main groove = 10.0) | 0.15 | 0.15 | 0.15 | 0.15 |
| Sectional configuration | Semicircular | Semicircular | Semicircular | Semicircular |
| Disposition | One side | One side | One side | One side |
|  | Outer side of tire | Outer side of tire | Outer side of tire | Outer side of tire |
| Noise dB(A) inside vehicle body | −0.3 | −0.4 | −0.7 | −0.7 |
| Anti-aquaplaning performance | 100 | 100 | 100 | 100 |

|  | E12 | E13 | E14 | E15 |
|---|---|---|---|---|
| Depth of narrow groove | 0.2 | 0.2 | 0.5 | 0.5 |
| Radial depth (mm) | 8.2 | 8.2 | 8.2 | 8.2 |
| Ratio = depth/depth of main groove (%) (depth of main groove = 8.2) | 100 | 100 | 100 | 100 |
| Pitch (mm) in equatorial direction | 0.8 | 1.2 | 2.0 | 5.0 |
| Pitch/width of main groove (Width of main groove = 10.0) | 0.08 | 0.12 | 0.2 | 0.5 |
| Sectional configuration | Semicircular | Semicircular | Semicircular | Semicircular |
| Disposition | One side | One side | One side | One side |
|  | Outer side of tire | Outer side of tire | Outer side of tire | Outer side of tire |
| Noise dB(A) inside vehicle body | −0.1 | −0.2 | −0.9 | −0.8 |
| Anti-aquaplaning performance | 100 | 100 | 100 | 100 |

|  | E16 | E17 | E18 |
|---|---|---|---|
| Depth of narrow groove | 0.5 | 0.5 | 0.5 |
| Radial depth (mm) | 8.2 | 8.2 | 8.2 |
| Ratio = depth/depth of main groove (%) (depth of main groove = 8.2) | 100 | 100 | 100 |
| Pitch (mm) in equatorial direction | 8.0 | 10.0 | 12.0 |
| Pitch/width of main groove (Width of main groove = 10.0) | 0.8 | 1.0 | 1.2 |
| Sectional configuration | Semicircular | Semicircular | Semicircular |
| Disposition | One side | One side | One side |
|  | Outer side of tire | Outer side of tire | Outer side of tire |
| Noise dB(A) inside vehicle body | −0.8 | −0.6 | −0.3 |
| Anti-aquaplaning performance | 100 | 100 | 100 |

|  | CE2 | CE3 | E19 | E20 |
|---|---|---|---|---|
| Depth of narrow groove | 0.5 | 0.5 | 0.5 | 0.5 |
| Radial depth (mm) | 8.2 | 8.2 | 8.2 | 8.2 |
| Ratio = depth/depth of main groove (%) (depth of main groove = 8.2) | 100 | 100 | 100 | 100 |
| Pitch (mm) in equatorial direction | 1.5 | 1.5 | 1.5 | 1.5 |
| Pitch/width of main groove (Width of main groove = 10.0) | 0.15 | 0.15 | 0.15 | 0.15 |
| Sectional configuration | Triangular | quadrilateral | Semicircular | Semicircular |
| Disposition | One side | One side | One side | Both sides |
|  | Outer side of tire | Outer side of tire | Inner side of tire |  |
| Noise dB(A) inside vehicle body | −0.3 | −0.4 | −0.7 | −1.0 |
| Anti-aquaplaning performance | 95 | 94 | 100 | 97 | where E denotes example and where CE denotes comparison example.

EXAMPLE 1

The tire of the example 1 had a construction similar to that of the pneumatic tire of the first embodiment. More specifically, the sectional configuration of the narrow groove was formed semicircularly. The maximum depth (radius) of the narrow groove was set to 0.5 mm. The length of the narrow groove in the radial direction of the tire was set to 8.2 mm (equal to the depth of the first longitudinal main groove). The pitch between adjacent narrow grooves in the circumferential direction of the tire was set to 1.5 mm (0.15 times the width of the first longitudinal main groove). The narrow groove was formed on only the outer side surface of the first longitudinal main groove (outer side with respect to the equatorial line).

EXAMPLE 2

The tire of the example 2 had a construction similar to that of the pneumatic tire of the example 1 except that the maximum depth of the narrow groove was set to 0.1 mm that was smaller than that of the narrow groove of the example 1.

EXAMPLE 3

The tire of the example 3 had a construction similar to that of the pneumatic tire of the example 1 except that the maximum depth of the narrow groove was set to 0.2 mm which was smaller than that of the narrow groove of the example 1.

EXAMPLE 4

The tire of the example 4 had a construction similar to that of the pneumatic tire of the example 1 except that the maximum depth of the narrow groove was set to 1.0 mm which was larger than that of the narrow groove of the example 1.

EXAMPLE 5

The tire of the example 5 had a construction similar to that of the pneumatic tire of the example 1 except that the maximum depth of the narrow groove was set to 2.0 mm which was larger than that of the narrow groove of the example 1.

EXAMPLE 6

The tire of the example 6 had a construction similar to that of the pneumatic tire of the example 1 except that the maximum depth of the narrow groove was set to 3.0 mm which was larger than that of the narrow groove of the example 1

EXAMPLE 7

The tire of the example 7 had a construction similar to that of the pneumatic tire of the example 1 except that the maximum depth of the narrow groove was set to 4.0 mm which was larger than that of the narrow groove of the example 1

EXAMPLE 8

The tire of the example 8 had a construction similar to that of the pneumatic tire of the example 1 except that the narrow groove was formed from the upper end of the side surface of the first longitudinal main groove in a length of 2.0 mm (24.4% of the depth of the first longitudinal main groove) in the radial direction of the tire.

EXAMPLE 9

The tire of the example 9 had a construction similar to that of the pneumatic tire of the example 1 except that the narrow groove was formed from the upper end of the side surface of the first longitudinal main groove in a length of 4.0 mm (48.8% of the depth of the first longitudinal main groove) in the radial direction of the tire.

EXAMPLE 10

The tire of the example 10 had a construction similar to that of the pneumatic tire of the example 1 except that the narrow groove was formed from the upper end of the side surface of the first longitudinal main groove in a length of 5.0 mm (61.0% of the depth of the first longitudinal main groove) in the radial direction of the tire.

EXAMPLE 11

The tire of the example 11 had a construction similar to that of the pneumatic tire of the example 1 except that the narrow groove was formed from the upper end of the side surface of the first longitudinal main groove in a length of 7.0 mm (85.4% of the depth of the first longitudinal main groove) in the radial direction of the tire.

EXAMPLE 12

The tire of the example 12 had a construction similar to that of the pneumatic tire of the example 1 except that the maximum depth of the narrow groove was set to 0.2 mm which was smaller than that of the narrow groove of the example 1 and that the pitch between adjacent narrow grooves in the circumferential direction of the tire was set to 0.8 mm (0.08 times as long as the width of the main groove).

EXAMPLE 13

The tire of the example 13 had a construction similar to that of the pneumatic tire of the example 1 except that the maximum depth of the narrow groove was set to 0.2 mm which was smaller than that of the narrow groove of the example 1 and that the pitch between adjacent narrow grooves in the circumferential direction of the tire was set to 1.2 mm (0.12 times as long as the width of the main groove).

EXAMPLE 14

The tire of the example 14 had a construction similar to that of the pneumatic tire of the example 1 except that the pitch between adjacent narrow grooves in the circumferential direction of the tire was set to 2.0 mm (0.2 times as long as the width of the main groove) which was larger than that of the narrow groove of the example 1.

EXAMPLE 15

The tire of the example 15 had a construction similar to that of the pneumatic tire of the example 1 except that the pitch between adjacent narrow grooves in the circumferential direction of the tire was set to 5.0 mm (0.5 times as long as the width of the main groove) which was larger than that of the narrow groove of the example 1.

EXAMPLE 16

The tire of the example 16 had a construction similar to that of the pneumatic tire of the example 1 except that the pitch between adjacent narrow grooves in the circumferential direction of the tire was set to 8.0 mm (0.8 times as long as the width of the main groove) which was larger than that of the narrow groove of the example 1.

EXAMPLE 17

The tire of the example 17 had a construction similar to that of the pneumatic tire of the example 1 except that the pitch between adjacent narrow grooves in the circumferential direction of the tire was set to 10.0 mm (equal to the width of the main groove) which was larger than that of the narrow groove of the example 1.

EXAMPLE 18

The tire of the example 18 had a construction similar to that of the pneumatic tire of the example 1 except that the pitch between adjacent narrow grooves in the circumferential direction of the tire was set to 12.0 mm (1.2 times as long as the width of the main groove) which was larger than that of the narrow groove of the example 1.

EXAMPLE 19

The narrow groove was formed on the side surface of the first longitudinal main groove at only the inner side thereof with respect to the equatorial line in the widthwise direction of the tire. The other constructions of the tire of the example 19 were similar to those of the tire of the example 1.

EXAMPLE 20

The tire of the example 20 had a construction similar to that of the pneumatic tire of the example 1 except that the narrow groove was formed on both side surfaces of the first longitudinal main groove.

COMPARISON EXAMPLE 1

The narrow groove was not formed on the side surface of the first longitudinal main groove.

COMPARISON EXAMPLE 2

The tire of the comparison example 2 had a construction similar to that of the pneumatic tire of the example 1 except that the narrow groove was sectionally a triangle which was symmetrical in the circumferential direction of the tire and had a length of 0.7 mm in its one side and a length of 0.5 mm in its depth.

COMPARISON EXAMPLE 3

The tire of the comparison example 3 had a construction similar to that of the pneumatic tire of the example 1 except that the narrow groove was sectionally a rectangle which was symmetrical in the circumferential direction of the tire and had a depth of 0.5 mm in its depth and a width of 11.0 mm in the circumferential direction of the tire.

Method of Measuring Noise-reducing Performance

Pattern noise levels when a vehicle traveled on a smooth asphalt road at 60 km an hour were measured with a microphone mounted at a position close to the right ear of a driver. Table 1 shows the difference between the reference (±0 dB(A)) which is the result of measurement of the first longitudinal main groove on which the narrow groove was not formed in comparison example 1 and the results of the examples and the comparison examples. The less numerical values is, the less the pattern noise is and thus favorable.

The vehicle used for the measurement had a stroke volume of 2000 cc and was right-handled. The air pressure of each of the pneumatic tires was set to 230 kPa.

Anti-aquaplaning Performance

The vehicle traveled on the asphalt road having a radius of 100 m by increasing the vehicle speed stepwise. A puddle having a depth of 10 mm and a length of 20 m was formed on the asphalt road. Lateral accelerations (lateral G) were measured to compute the average lateral G of the front wheel at the speed of 50 to 80 km an hour. The anti-aquaplaning performance is shown by indexes, supposing that the anti-aquaplaning performance of the comparison example 1 is 100. The more numerical values are, the more favorable the anti-aquaplaning performance is.

The vehicle used for the measurement had a stroke volume of 2000 cc. The air pressure of each of the pneumatic tires was set to 230 kPa.

As described above, the pneumatic tires of the examples 1 through 20 had the first longitudinal main groove formed on the tread surface thereof in the circumferential direction thereof and the narrow grooves, each having a circular arc surface, which were formed on the side surface of the first longitudinal main groove by extending the narrow grooves in the radial direction of the tire. From the results shown in table 1, it was confirmed that without deteriorating the anti-aquaplaning performance, the pneumatic tires of the examples 1 through 20 had noise-reducing performance improved over that of the pneumatic tire of the comparison example 1 that did not have the narrow groove and the comparison examples 2 and 3 that had sectionally triangular or rectangular narrow grooves. That is, it was confirmed that the pneumatic tires of the examples 1 through 20 having the narrow grooves circular arc-shaped in the sectional configuration had preferable noise-reducing performance and anti-aquaplaning performance.

It was also confirmed that the narrow grooves did not deteriorate the anti-aquaplaning performance.

What is claimed is:

1. A pneumatic tire comprising:
   a longitudinal main groove formed concavely on a tread surface thereof in a radial direction thereof by extending said longitudinal main groove linearly in a circumferential direction thereof; wherein
   narrow grooves are formed concavely on at least an outer side surface of side surfaces of said longitudinal main groove opposed to each other in a widthwise direction of said pneumatic tire, with a bottom surface of said longitudinal main groove interposed between said side surfaces, said narrow grooves being spaced at certain intervals in a circumferential direction of said pneumatic tire;
   a length of each of said narrow grooves in the radial direction of said pneumatic tire is set to 100% of a depth of the longitudinal main groove;
   each of said narrow grooves linearly extends in a direction between a bottom surface of said longitudinal main groove and a grounding surface of a tread surface;
   a portion of a side surface of said longitudinal main groove where said narrow grooves are not formed has an arc-shape that projects toward an opposed side surface of said longitudinal main groove;
   said side surface of said longitudinal main groove is continued with the grounding edge of said surface of said longitudinal main groove;

said grounding edge of the side surface of said longitudinal main groove and side edge of the bottom surface of said longitudinal main groove are linearly continuous in a circumferential direction of the pneumatic tire;

an opening of each of said narrow grooves formed in a side surface of said longitudinal main groove has a shape that is elliptic or oblong in the radial direction of the pneumatic tire;

a bottom surface of each of said narrow grooves in said radial direction of said pneumatic tire is circular arc-shaped and is continuous with an edge of said bottom surface of said longitudinal main groove and with a grounding edge of said tread surface;

a grounding edge of a side surface of said longitudinal main groove is linearly continuous in said circumferential direction of said pneumatic tire;

wherein each of said narrow grooves is so configured that a longer side of each of said narrow grooves extends in said radial direction of said pneumatic tire or in the same direction as a depth direction of said longitudinal main groove and that a shorter side of each of said narrow grooves extends in said circumferential direction of said pneumatic tire orthogonal to said radial direction of said pneumatic tire; and a sectional configuration of a position having a maximum sectional area in each of said narrow grooves is circular arc-shaped.

2. The pneumatic tire according to claim 1, wherein a depth of each of said narrow grooves from a side surface of said longitudinal main groove is varied in said radial direction of said pneumatic tire in such a way that a maximum depth of each of said narrow grooves is set to not less than 0.2 mm nor more than 3.0 mm.

3. The pneumatic tire according to claim 1, wherein a volume of each of said narrow grooves is set to 0.1 $mm^3$ to 180 $mm^3$.

4. The pneumatic tire according to claim 1, wherein said narrow grooves are formed on a side surface of said longitudinal main groove having a width of not less than 2.0 mm nor more than 30.0 mm and a depth of not less than 5.0 mm nor more than 20.0 mm.

5. The pneumatic tire according to claim 1, wherein a pitch between adjacent narrow grooves concavely formed on a side surface of said longitudinal main groove in a circumferential direction of said pneumatic tire is set not less than 0.1 times nor more than 1.0 time a width of said longitudinal main groove.

6. The pneumatic tire according to claim 1, wherein said narrow grooves concavely are formed on said both side surfaces of said longitudinal main groove, and said narrow grooves formed at said one side surface of said longitudinal main groove and said narrow grooves formed at said other side surface thereof are symmetrical or zigzag with respect to a central line in said widthwise direction of said pneumatic tire.

7. A pneumatic tire comprising:

a plurality of said longitudinal main grooves being formed at certain intervals on a tread surface thereof in a widthwise direction of said pneumatic tire, said longitudinal main grooves formed concavely on said tread surface in a radial direction thereof by extending said longitudinal main grooves linearly in a circumferential direction thereof; wherein narrow grooves are formed concavely only on an outer side surface of side surfaces of each of said longitudinal main grooves disposed at left and right sides with respect to a central position in said widthwise direction, said side surfaces being opposed to each other in the widthwise direction, with a bottom surface of said longitudinal main groove interposed between said side surfaces, said narrow grooves being spaced at certain intervals in a circumferential direction of said pneumatic tire;

a length of each of said narrow grooves in the radial direction of said pneumatic tire is set to 100% of a depth of the longitudinal main groove;

each of said narrow grooves linearly extends in a direction between a bottom surface of said longitudinal main groove and a grounding surface of a tread surface;

a portion of a side surface of said longitudinal main groove where said narrow grooves are not formed has an arc-shape that projects toward an opposed side surface of said longitudinal main groove;

a bottom surface of each of said narrow grooves in said radial direction of said pneumatic tire is circular arc-shaped and is continuous with an edge of said bottom surface of said longitudinal main groove and with a grounding edge of said tread surface, and a grounding edge of a side surface of said longitudinal main groove is linearly continuous in said circumferential direction of said pneumatic tire;

said side surface of said longitudinal main groove is continued with the grounding edge of said surface of said longitudinal main groove;

said grounding edge of the side surface of said longitudinal main groove and side edge of the bottom surface of said longitudinal main groove are linearly continuous in a circumferential direction of the pneumatic tire;

an opening of each of said narrow grooves formed in a side surface of said longitudinal main groove has a shape that is elliptic or oblong in the radial direction of the pneumatic tire;

wherein each of said narrow grooves is so configured that a longer side of each of said narrow grooves extends in said radial direction of said pneumatic tire or in the same direction as a depth direction of said longitudinal main groove and that a shorter side of each of said narrow grooves extends in said circumferential direction of said pneumatic tire orthogonal to said radial direction of said pneumatic tire; and a sectional configuration of a position having a maximum sectional area in each of said narrow grooves is circular arc-shaped.

8. A pneumatic tire comprising:

a longitudinal main groove formed concavely on a tread surface thereof in a radial direction thereof by extending said longitudinal main groove linearly in a circumferential direction thereof, wherein narrow grooves are formed concavely on both side surfaces of said longitudinal main groove disposed at a central position in said widthwise direction of said pneumatic tire, said side surfaces being opposed to each other in a widthwise direction of said pneumatic tire, with a bottom surface of said longitudinal main groove interposed between said side surfaces, said narrow grooves being spaced at certain intervals in a circumferential direction of said pneumatic tire;

a length of each of said narrow grooves in the radial direction of said pneumatic tire is set to 100% of a depth of the longitudinal main groove, each of said narrow grooves linearly extends in a direction between a bottom surface of said longitudinal main groove and a grounding surface of a tread surface, a portion of a side surface of said longitudinal main groove where said narrow grooves are not formed has an arc-shape that projects toward an opposed side surface of said longitudinal main groove, said side surface of said longitudinal main groove is continued with the grounding edge of said surface of said longitudinal main groove, a bottom surface of each of said narrow grooves in said radial direction of said pneumatic tire is circular arc-shaped and is continuous with an edge of said bottom surface of said longitudinal main groove and with a grounding edge of said tread surface, and a grounding edge of a side surface of said longitudinal main groove is linearly continuous in said circumferential direction of said pneumatic tire;

said grounding edge of the side surface of said longitudinal main groove and side edge of the bottom surface of said longitudinal main groove are linearly continuous in a circumferential direction of the pneumatic tire, an opening of each of said narrow grooves formed in a side surface of said longitudinal main groove has a shape that is elliptic or oblong in the radial direction of the pneumatic tire, wherein each of said narrow grooves is so configured that a longer side of each of said narrow grooves extends in said radial direction of said pneumatic tire or in the same direction as a depth direction of said longitudinal main groove and that a shorter side of each of said narrow grooves extends in said circumferential direction of said pneumatic tire orthogonal to said radial direction of said pneumatic tire; and a sectional configuration of a position having a maximum sectional area in each of said narrow grooves is circular arc-shaped.

* * * * *